US011694101B1

(12) United States Patent
Xu et al.

(10) Patent No.: US 11,694,101 B1
(45) Date of Patent: Jul. 4, 2023

(54) PREDICTIVE SENSOR SYSTEM FOR AIRCRAFT ENGINES WITH GRAPHICAL USER INTERFACE

(71) Applicant: AMERICAN AIRLINES, INC., Fort Worth, TX (US)

(72) Inventors: Ning Xu, Euless, TX (US); Jose Antonio Ramirez-Hernandez, Mansfield, TX (US); Steven James Oakley, Euless, TX (US); Mei Zhang, Lewisville, TX (US); Ou Bai, Euless, TX (US); Supreet Reddy Mandala, Keller, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

(21) Appl. No.: 17/811,965

(22) Filed: Jul. 12, 2022

Related U.S. Application Data

(63) Continuation of application No. 16/688,352, filed on Nov. 19, 2019, now Pat. No. 11,410,056.

(60) Provisional application No. 62/770,035, filed on Nov. 20, 2018.

(51) Int. Cl.
| | | |
|---|---|---|
| *G06N 5/04* | (2023.01) | |
| *G06N 20/00* | (2019.01) | |
| *G07C 5/00* | (2006.01) | |
| *G07C 5/08* | (2006.01) | |
| *G06F 3/0482* | (2013.01) | |

(52) U.S. Cl.
CPC .............. *G06N 5/04* (2013.01); *G06N 20/00* (2019.01); *G07C 5/008* (2013.01); *G07C 5/085* (2013.01); *G06F 3/0482* (2013.01)

(58) Field of Classification Search
CPC .......... G06N 5/04; G06N 20/00; G07C 5/008; G07C 5/085; G06F 3/0482
USPC .......................................................... 706/11
See application file for complete search history.

(56) References Cited

U.S. PATENT DOCUMENTS

| 7,778,891 | B1 * | 8/2010 | Zhang | G06Q 10/087 |
| | | | | 705/28 |
| 8,112,368 | B2 * | 2/2012 | Eklund | G06F 11/008 |
| | | | | 703/22 |
| 8,131,484 | B2 * | 3/2012 | Kirillov | G01M 15/12 |
| | | | | 702/56 |
| 8,849,690 | B1 * | 9/2014 | Yang | G06Q 10/063116 |
| | | | | 705/7.17 |

(Continued)

*Primary Examiner* — William D Titcomb
(74) *Attorney, Agent, or Firm* — Haynes and Boone, LLP

(57) ABSTRACT

A system according to which a network of physical sensors are configured to detect and track the performance of aircraft engines. The physical sensors are placed in specific locations to detect an exhaust gas temperature, vibration, speed, oil pressure, and fuel flow for each aircraft engine. The performance of each aircraft engine is then viewed in combination with oil consumption associated with that aircraft engine and the routine maintenance program associated with that aircraft engine to route the aircraft and move the aircraft, in accordance with the routing, to a specific location. The sensors efficiently track the performance and physical condition of the engines. Moreover, a listing of identified "at-risk" engines is displayed on a screen of a GUI in a manner that allows for easy navigation and display. Data point(s) that triggered the identification of each "at-risk" engine are easily accessible and viewable.

30 Claims, 16 Drawing Sheets

(56) References Cited

U.S. PATENT DOCUMENTS

| | | | | |
|---|---|---|---|---|
| 9,014,878 | B2* | 4/2015 | Gu | G06Q 10/00 |
| | | | | 701/34.2 |
| 9,747,564 | B1* | 8/2017 | Shi | G06Q 10/0631 |
| 10,062,053 | B1* | 8/2018 | Oakley | G06Q 10/0875 |
| 10,373,087 | B1* | 8/2019 | Yang | G06Q 10/06315 |
| 10,474,789 | B2* | 11/2019 | Ethington | G05B 23/0283 |
| 10,705,198 | B2* | 7/2020 | Santra | G01M 1/16 |
| 10,725,463 | B1* | 7/2020 | Dixit | B64D 45/00 |
| 10,732,618 | B2* | 8/2020 | Xin | G05B 23/0283 |
| 10,867,455 | B2* | 12/2020 | Segal | G07C 5/008 |
| 10,929,771 | B2* | 2/2021 | Goldfarb | G06N 20/00 |
| 10,964,130 | B1* | 3/2021 | Dixit | G05B 23/0283 |
| 2010/0023201 | A1* | 1/2010 | Kinney | G07C 5/008 |
| | | | | 701/1 |
| 2011/0087387 | A1* | 4/2011 | Safa-Bakhsh | G07C 5/085 |
| | | | | 701/19 |
| 2013/0304307 | A1* | 11/2013 | Safa-Bakhsh | G07C 5/006 |
| | | | | 711/E12.001 |
| 2016/0196457 | A1* | 7/2016 | Mylaraswamy | G07C 5/085 |
| | | | | 340/10.1 |
| 2016/0207639 | A1* | 7/2016 | Ellis | G07C 5/085 |
| 2016/0318622 | A1* | 11/2016 | Haukom | G07C 5/0808 |
| 2017/0061295 | A1* | 3/2017 | Horabin | G05B 23/0235 |
| 2017/0193372 | A1* | 7/2017 | Schimert | G06N 5/04 |
| 2017/0235796 | A1* | 8/2017 | Vali | G06F 16/24568 |
| | | | | 706/11 |
| 2018/0137219 | A1* | 5/2018 | Goldfarb | G06F 18/2115 |
| 2018/0137431 | A1* | 5/2018 | Goldfarb | G06N 20/00 |
| 2018/0322714 | A1* | 11/2018 | Gennotte | G07C 5/0808 |
| 2019/0128191 | A1* | 5/2019 | Moravek | F02C 7/277 |
| 2019/0179647 | A1* | 6/2019 | Deka | G06N 20/00 |

\* cited by examiner

255 — TRAIN A MODULE IN A FIRST STAGE USING A TRAINING DATA SET
- 260 — ACCESS TRAINING DATA SET
- 265 — GENERATE A PLURALITY OF LISTINGS OF PREDICTED ENGINES USING THE TRAINING DATA SET AND USING A PLURALITY OF MACHINE LEARNING MODELS

270 — TRAIN THE MODULE IN A SECOND STAGE USING THE PLURALITY OF LISTINGS OF PREDICTED ENGINES
- 275 — COMPARE THE LISTING OF REMOVED ENGINES WITH EACH OF THE LISTINGS OF PREDICTED ENGINES TO IDENTIFY FALSE POSITIVES AND FALSE NEGATIVES ASSOCIATED WITH EACH OF THE LISTINGS OF PREDICTED ENGINES
- 280 — WEIGH, BASED ON A NUMBER OF FALSE POSITIVES AND FALSE NEGATIVES WITHIN THE LISTING OF PREDICTED ENGINES ASSOCIATED WITH EACH MACHINE LEARNING MODEL, EACH MACHINE LEARNING MODEL WITHIN A FITNESS FUNCTION TO MINIMIZE A NUMBER OF COMBINED FALSE POSITIVES AND A NUMBER OF COMBINED FALSE NEGATIVES

285 — ACCESS ENGINE DATA FOR EACH ENGINE IN THE FLEET

290 — ACCESS OPERATIONAL DATA REGARDING ROUTINE MAINTENANCE FOR EACH ENGINE IN THE FLEET

295 — ACCESS OIL CONSUMPTION OF EACH ENGINE IN THE FLEET

300 — CREATE, USING THE TRAINED MODULE, THE ENGINE DATA, THE OPERATIONAL DATA, AND THE OIL CONSUMPTION, A LISTING OF ENGINES THAT ARE PREDICTED TO HAVE AN UNPLANNED MAINTENANCE EVENT WITHIN THE PREDETERMINED PERIOD OF TIME

305 — DISPLAY THE LISTING OF ENGINES ON THE GUI

310 — PROVIDE AN ALERT REGARDING AN ENGINE IN THE LISTING OF ENGINES

315 — ROUTE AN AIRCRAFT WITH THE ENGINE TO MAINTENANCE FACILITY

TRAINING

| ACTUAL | PREDICT | RF1 | RF2 | NB | GBM1 | GBM2 | DP1 | DP2 | GLM | SVM |
|---|---|---|---|---|---|---|---|---|---|---|
| "FALSE" | "FALSE" | 43072 | 43070 | 31614 | 43022 | 43073 | 39150 | 43042 | 41874 | 43061 |
| "FALSE" | "TRUE" | 1 | 3 | 11459 | 51 | 0 | 3923 | 31 | 1199 | 12 |
| "TRUE" | "FALSE" | 179 | 0 | 584 | 201 | 1 | 401 | 1760 | 845 | 150 |
| "TRUE" | "TRUE" | 1926 | 2105 | 1521 | 1904 | 2104 | 1704 | 345 | 1260 | 1955 |

VALIDATION

| ACTUAL | PREDICT | rf1v | rf2v | nb1v | gbm1v | gbm2v | dp1v | dp2v | glm1v | svmv1 |
|---|---|---|---|---|---|---|---|---|---|---|
| "FALSE" | "FALSE" | 10414 | 10449 | 6871 | 10294 | 10450 | 9263 | 10418 | 10052 | 10204 |
| "FALSE" | "TRUE" | 36 | 1 | 3579 | 156 | 0 | 1187 | 32 | 398 | 246 |
| "TRUE" | "FALSE" | 527 | 532 | 29 | 482 | 535 | 357 | 494 | 191 | 390 |
| "TRUE" | "TRUE" | 8 | 3 | 506 | 53 | 0 | 178 | 41 | 344 | 145 |

TESTING

| ACTUAL | PREDICT | rf1e | rf2e | nb1e | gbm1e | gbm2e | dp1e | dp2e | glm1e | svme1 |
|---|---|---|---|---|---|---|---|---|---|---|
| "FALSE" | "FALSE" | 12337 | 12383 | 8749 | 12167 | 12392 | 10761 | 12355 | 11750 | 11963 |
| "FALSE" | "TRUE" | 55 | 9 | 3643 | 225 | 0 | 1631 | 37 | 642 | 429 |
| "TRUE" | "FALSE" | 611 | 661 | 175 | 605 | 661 | 449 | 644 | 302 | 528 |
| "TRUE" | "TRUE" | 50 | 0 | 486 | 56 | 0 | 212 | 17 | 359 | 133 |

FROM Fig. 11A

| | | | | | | | ESN |
|---|---|---|---|---|---|---|---|
| | | | | | | | ▼ (All) |
| | | | | | | | ☑ 38124 |
| 802604 | 3AM | | | | 57% 8/8/2017 High Oil Consumption | 57% 7/24/2017 High Oil Consumption | ☑ 38131 |
| 874821 | 3CK | 34% | | 41% | 44% | 51% | ☑ 38134 |
| 802617 | 3EM | 59% | | 59% | 60% | 47% | ☑ 38136 |
| 877283 | 3DA | 30% 7/24/2017 Metal in Screen | 11% 7/24/2017 Metal in Screen | 10% 7/24/2017 Metal in Screen | 11% 7/24/2017 Metal in Screen | 45% 7/24/2017 Metal in Screen | ☑ 38213 |
| 804590 | 3GV | 34% 8/1/2017 Oil Consumption | 29% 8/1/2017 Oil Consumption | 26% 8/1/2017 High Oil Consumption | 25% 8/1/2017 Oil Consumption | 34% 8/1/2017 Oil Consumption | ☑ 38264 |
| 802850 | 3FB | 33% | 36% | 28% | 38% | 34% | ☑ 38308 |
| 805563 | 3GT | 30% | 39% | 46% | 40% | 34% | ☑ 38325 |
| 876698 | 3HJ | | 18% 9/25/2017 High Oil Consumption | 7% 9/25/2017 High Oil Consumption | 10% 9/25/2017 High Oil Consumption | 34% 9/25/2017 Oil Consumption | ☑ 38347 |
| 889385 | 3JE | 9% | 14% | 11% | 13% | 33% | ☑ 38350 |
| 888265 | 3DG | 30% | 24% | 24% | 29% | 32% | ☑ 38380 |
| 889623 | 3AH | 15% | 15% | 20% | 20% | 32% | ☑ 38381 |
| 876602 | 3BP | 11% 9/23/2017 Time-LLP | 19% 9/23/2017 Time-LLP | 27% 9/23/2017 Time-LLP | 27% 9/23/2017 Time-LLP | 31% 9/23/2017 Time-LLP | ☑ 657954 |
| 888143 | 3AR | 45% | 28% | 30% | 40% | 30% | ☑ 658117 |
| 889421 | 3AA | 16% | 22% | 23% | 33% | 29% | ☑ 658128 |
| 874657 | 3AJ | 12% | 12% | 11% | 27% | 29% | ☑ 658129 |
| 877371 | 3DL | 27% | 9% | 22% | 25% | 28% | ☑ 658132 |
| 877210 | 3KE | 18% 8/21/2017 Performance Deterioration | 11% 8/21/2017 Performance Deterioration | 10% 8/21/2017 Performance Deterioration | 28% 8/21/2017 Performance Deterioration | 28% 8/21/2017 Performance Deterioration | ☑ 658137 |
| | | | | | | | ☑ 658159 |
| | | | | | | | ☑ 658167 |
| | | | | | | | ☑ 658207 |
| | | | | | | | ☑ 658214 |
| | | | | | | | ☑ 658215 |
| | | | | | | | ☑ 658256 |

Home > ⌂ Maintenance_Information_Display > ▦ Watch List > ▦ Watch List Monthly > ☆

← Undo → Redo ← Revert ⟲ Refresh ⏸ Pause

| Watch List Biweekly | Watch List Monthly | Sensor Data | View: *▦ Original ⚠ Alert ✉ Subscribe ✎ Edit ⋖ Share ⇩ Download ☐ Full Screen |

Monthly Watch List of Engines at Risk — 440, 445

Monthly Prediction Aver... — 455

☐ (All)
☑ January
☑ February
☑ March
☐ April
☐ May
☐ June
☐ July
☐ August
☐ September
☐ October

| ESN | Aircra... | January (450c) | February (450b) | March (450a) |
|---|---|---|---|---|
| 876489 | 3BU | 46% 4/10/2017 ESV2s NGV Distress | 56% 4/10/2017 ESV2s NGV Distress | 81% 4/10/2017 ESV2s NGV Distress |
| 876686 | 3AV | 34% 4/19/2017 ESV2s Vibration | 74% 4/19/2017 ESV2s Vibration | 70% 4/19/2017 ESV2s Vibration |
| 874600 | 3GN | 43% | 48% | 48% |
| 877355 | 3HB | 15% 3/17/2017 C&R Vibration | 50% 3/17/2017 C&R Vibration | 46% 3/17/2017 C&R Vibration |
| 802278 | 3DT | 18% 3/23/2017 T/C HPC Blade Distress | 41% 3/23/2017 T/C HPC Blade Distress | 46% 3/23/2017 T/C HPC Blade Distress |
| 804151 | 3FP | 37% 5/8/2017 CR1 High Oil Consumption | 43% 5/8/2017 CR1 High Oil Consumption | 43% 5/8/2017 CR1 High Oil Consumption |
| 802604 | 3AM | 46% 8/8/2017 C&R1 High Oil Consumption | 49% 8/8/2017 C&R1 High Oil Consumption | 42% 8/8/2017 C&R1 High Oil Consumption |
| 877295 | 3BA | 37% | 48% | |
| 802617 | 3EM | | | 42% 6/11/2017 C&R Vibration |

TO Fig. 12B 475, 470, 410

| 876600 | 3CA | | 47% 8/14/2017 C&R High Oil Consumption | 39% 8/14/2017 C&R High Oil Consumption | 37% 8/14/2017 C&R High Oil Consumption |
|---|---|---|---|---|---|
| 875545 | 3GS | | 17% | 28% | 35% |
| 804220 | 3FV | | 42% 6/12/2017 C&R Metal in Screen | 26% 6/12/2017 C&R Metal in Screen | 34% 6/12/2017 C&R Metal in Screen |
| 960310 | 3HG | | 15% 7/12/2017 C&R High Oil Consumption | 25% 7/12/2017 C&R High Oil Consumption | 34% 7/12/2017 C&R High Oil Consumption |
| 804590 | 3GV | | 11% 8/1/2017 C&R High Oil Consumption | 21% 8/1/2017 C&R High Oil Consumption | 34% 8/1/2017 C&R High Oil Consumption |
| 874657 | 3AJ | | 28% | 25% | 33% |
| 876470 | 3AN | | 11% | 25% | 31% |
| 874821 | 3CK | | 33% | 29% | 30% |
| 888430 | 3DM | | 7% | 19% | 29% |
| 877369 | 3KF | | 16% | 31% | 29% |
| 804526 | 3GP | | 7% | 7% | 29% |
| 877268 | 3AP | | 11% 7/10/2017 ESV1s Time-LLP | 22% 7/10/2017 ESV1s Time-LLP | 29% 7/10/2017 ESV1s Time-LLP |
| 874716 | 3BW | | 21% | 27% | 28% |

ESN
☑ (All)
☑ 38124
☑ 38131
☑ 38134
☑ 38136
☑ 38213
☑ 38264
☑ 38308
☑ 38325
☑ 38347
☑ 38350
☑ 38380
☑ 38381
☑ 657954
☑ 658117
☑ 658128
☑ 658129
☑ 658132
☑ 658137

Avg. Prob
4% 92%

FROM Fig. 12A

Fig. 12B

PREDICTIVE SENSOR SYSTEM FOR AIRCRAFT ENGINES WITH GRAPHICAL USER INTERFACE

CROSS-REFERENCE TO RELATED APPLICATIONS

This application is a continuation of U.S. application Ser. No. 16/688,352, filed Nov. 19, 2019, which claims the benefit of the filing date of, and priority to, U.S. Application No. 62/770,035, filed Nov. 20, 2018, the entire disclosures of which are hereby incorporated herein by reference.

BACKGROUND

Aircraft engines generally follow a scheduled maintenance plan. The maintenance plan requires heavy maintenance, which often requires the engine to be grounded for weeks, and lighter maintenance, which requires a shorter ground time than heavy maintenance to complete. Airlines maintain a specific number of aircraft engines in their fleets based on a predicted or specific number of engines that will be grounded for heavy and/or light maintenance. However, when an aircraft engine is unexpectedly grounded due to a maintenance issue, not only does it require an unscheduled repair/correction, but it can also result in flight delays and/or cancellations, reduction in customer satisfaction, and/or budgeting problems. Engine removals for maintenance, which generally occur during a heavy maintenance visit, are time-consuming and expensive.

While systems might predict the number of unidentifiable aircraft engines that will require unexpected grounding due to maintenance-related issues over a predetermined period of time, these systems do not identify the specific aircraft engine that is predicted to be grounded. Thus, the aircraft engine may be grounded at a location that does not include adequate maintenance personnel and/or equipment to perform the required maintenance. Moreover, the predetermined period of time for these systems often spans many months, such as three-month periods. As such, there is uncertainty regarding which engines will be unexpectedly grounded and when that grounding will occur.

The inability to identify specific aircraft engines that are predicted to be grounded is due in part to the inability of previous systems to receive and adequately analyze sensor data associated with each aircraft engine. Moreover, analysis of available historical data has been limited in part due to the amount of time required to run a prediction model using conventional analytical models and due to the amount of memory required to do so. Specifically, the existing computer systems and analytical models are inadequate to support the amount of sensor data and analysis thereof. Moreover, there are problems in displaying the prediction results on a graphical user interface. That is, thousands of sensors that monitor hundreds of engines can result in millions of data points. Presenting a listing of "at-risk" engines and sensor data points associated therewith is tedious and not user-friendly. Said differently, there is no existing way to accurately provide and navigate through the prediction results in a user-friendly manner.

BRIEF DESCRIPTION OF THE DRAWINGS

FIG. 7 is a flow chart illustration of a method of operating the system of FIG. 1, according to an example embodiment.

FIG. 9 is a summary of results illustrating the accuracy of the system of FIG. 1, according to an example embodiment.

FIGS. 11A and 11B together are a second screen displayed on the graphical user interface of FIG. 1, according to an example embodiment.

FIGS. 12A and 12B together are a third screen displayed on the graphical user interface of FIG. 1, according to an example embodiment.

DETAILED DESCRIPTION

The Predictive Sensor System for Aircraft Engines with Graphical User Interface ("ESDA") uses a network of physical sensors that are configured to detect and track the performance of aircraft engines. The network of physical sensors is placed in specific locations to detect an exhaust gas temperature, vibration, speed, oil pressure, and fuel flow for each aircraft engine. The performance of each aircraft engine is then viewed in combination with oil consumption associated with that aircraft engine and the routine maintenance program associated with that aircraft engine to, in some embodiments, route the aircraft and move the aircraft in accordance with the routing, to a specific location. Thus, the network of sensors is used in an unconventional utilization to reduce errors in performing maintenance on engines, such as less thorough repair or maintenance than required. That is, the plurality of sensors more efficiently tracks the performance and physical condition of the engines. In some embodiments, additional actions are taken such as maintenance being performed, sensors being checked, etc. Moreover, a listing of identified "at-risk" engines is displayed on a screen of a graphical user interface ("GUI") in a manner that allows for easy navigation and display. Data points, which triggered the identification of each "at-risk" engine, are easily accessible and viewable.

Figure 1:
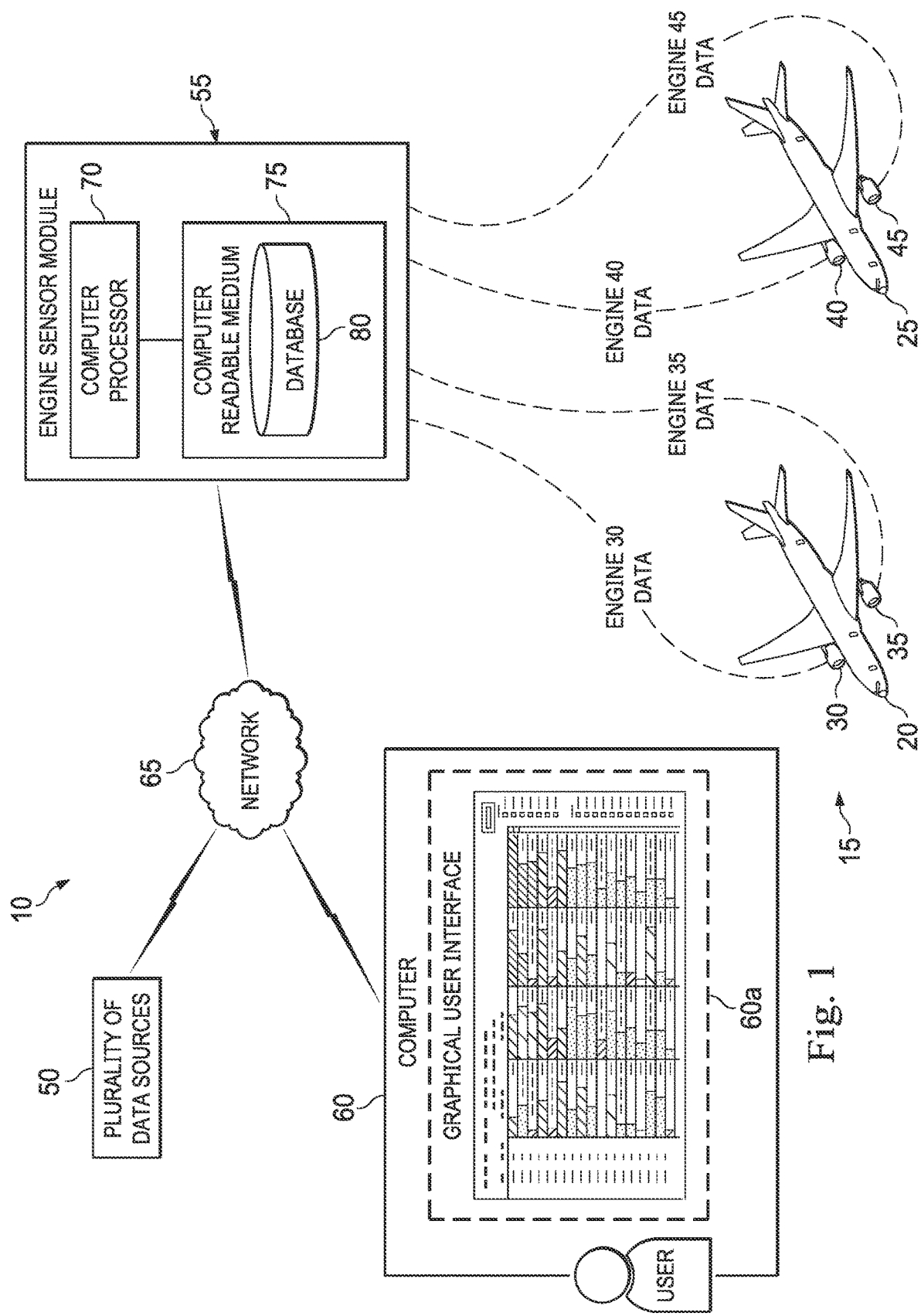
FIG. 1 is a diagrammatic illustration of a predictive sensor system for aircraft engines according to an example embodiment, the system including an engine sensor module, a plurality of data sources, an aircraft, engines, engine sensors, and a computer having a graphical user interface.

In an example embodiment, referring to FIG. 1, the ESDA is illustrated and designated by reference numeral 10. In an example embodiment, the ESDA 10 includes a fleet of aircraft 15, with each aircraft, such as aircraft 20 and 25, being associated with at least two engines, which are designated as engine 30 and engine 35 for aircraft 20 and engine 40 and engine 45 for aircraft 25. The fleet of aircraft 15 can include any number of aircraft, such as between 0-100, 100-200, 200-300, 400-500, 500-600, 600-700, 700-800, 500-1,000, 1,000-2,000, and 2,000-10,000 aircraft. As will be described in further detail below, one or more sensors are associated with each engine within the aircraft fleet 15. Data from each engine, such as engines 30, 35, 40, and 45, along with data from a plurality of sources 50 is received by an Engine Sensor Module 55. The ESDA 10 also includes a computer 60 that includes a GUI 60a, the plurality of sources 50, and the Engine Sensor Module 55, which are in communication via a network 65. In one or more example embodiments, the Engine Sensor Module 55 includes a computer processor 70 and a computer readable medium 75 operably coupled thereto. Instructions accessible to, and executable by, the computer processor are stored on the computer readable medium 75. A database 80 is also stored in the computer readable medium 75.

Figure 2:
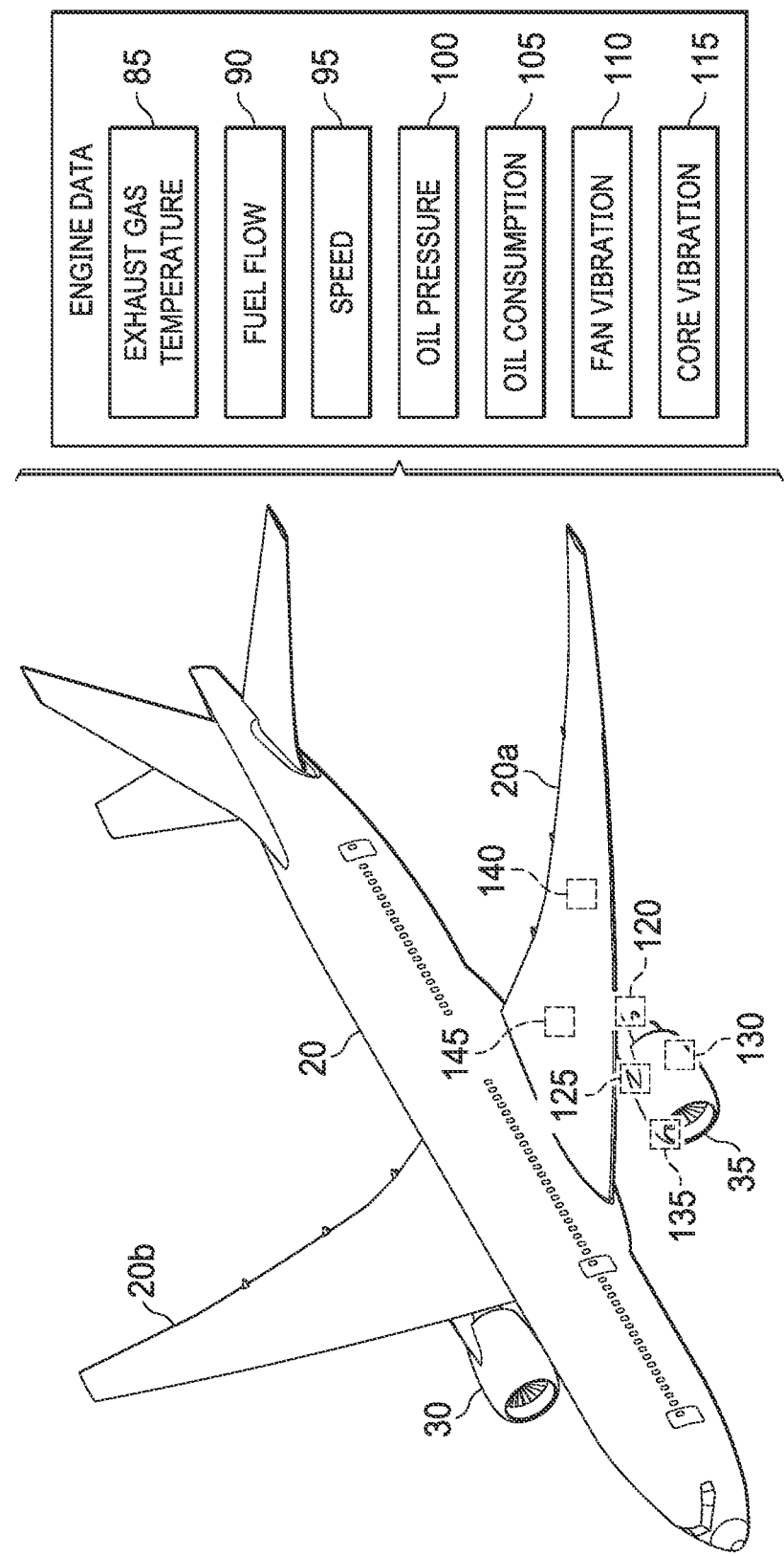
FIG. 2 is a diagrammatic illustration of the aircraft, the engines, and the engine sensors of FIG. 1 and a graphical representation of data associated with the engine sensors, according to an example embodiment.

FIG. 2 is an illustration of the aircraft 20 that is within the fleet of aircraft 15, the sensors associated with the engine 35, and data associated with each of the sensors. The aircraft 20 includes a first wing 20a and a second wing 20b. An engine, such as the engine 35, is coupled to the first wing 20a and a paired engine, such as the engine 30, is coupled to the second wing 20b. In one example embodiment, engine data includes exhaust gas temperature data 85, fuel flow data 90, speed data 95, oil pressure data 100, oil consumption data 105, fan vibration data 110, and core vibration data 115. The engine data may include additional data. In one example embodiment, the gas temperature data 85, the fuel flow data 90, the speed data 95, the oil pressure data 100, the oil consumption data 105, the fan vibration data 110, and the core vibration data 115 are detected by the sensor 120, 125, 130, 135, 140, and 145, respectively. Each of the sensors 120, 125, 130, 135, 140, and 145 is positioned and configured to detect a physical condition or parameter associated with the engine 35 and/or the aircraft 20. Thus, the sensors 120, 125, 130, 135, 140, and 145 are placed in a and specialized arrangement. In some embodiments, one or more of the sensors 120, 125, 130, 135, 140, and 145: track the motion of engine turbine blades and is/are mounted near the engine turbine blade; track the level of oil associated with the engine 35 and is/are mounted near an oil reservoir; track the level of fuel associated with the engine 35 and is/are mounted near a fuel reservoir; and/or track the fan movement/motion of the engine 35, etc. In some embodiments, the engine data includes data for specific events and identifies the data with the specific event, such as a take-off event and a cruise event.

Figure 3:
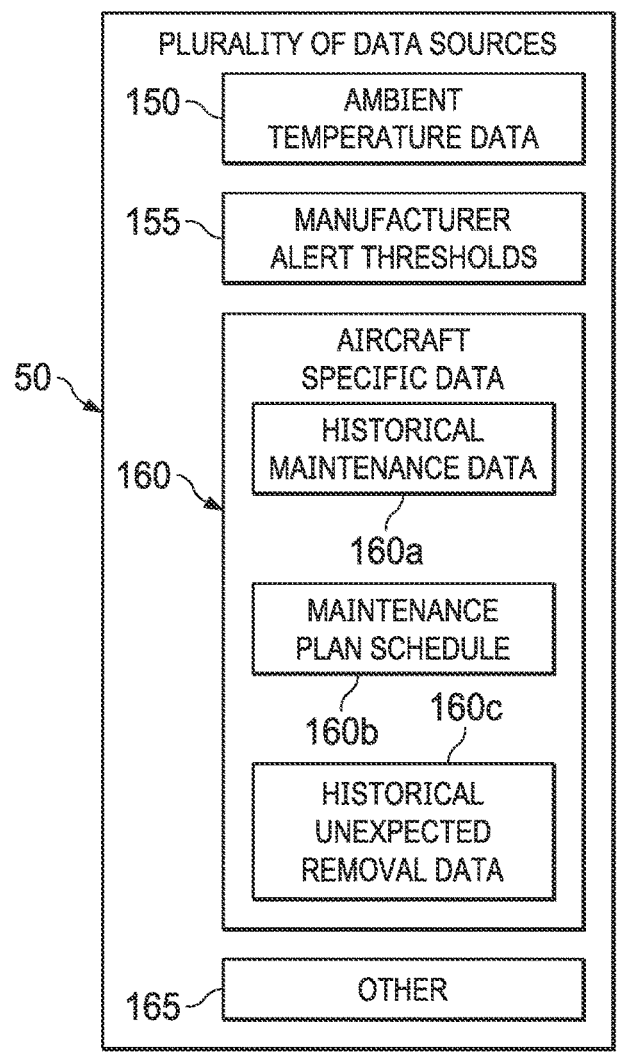
FIG. 3 is a representation of the plurality of data sources and data associated therewith, according to an example embodiment.
Figure 4:
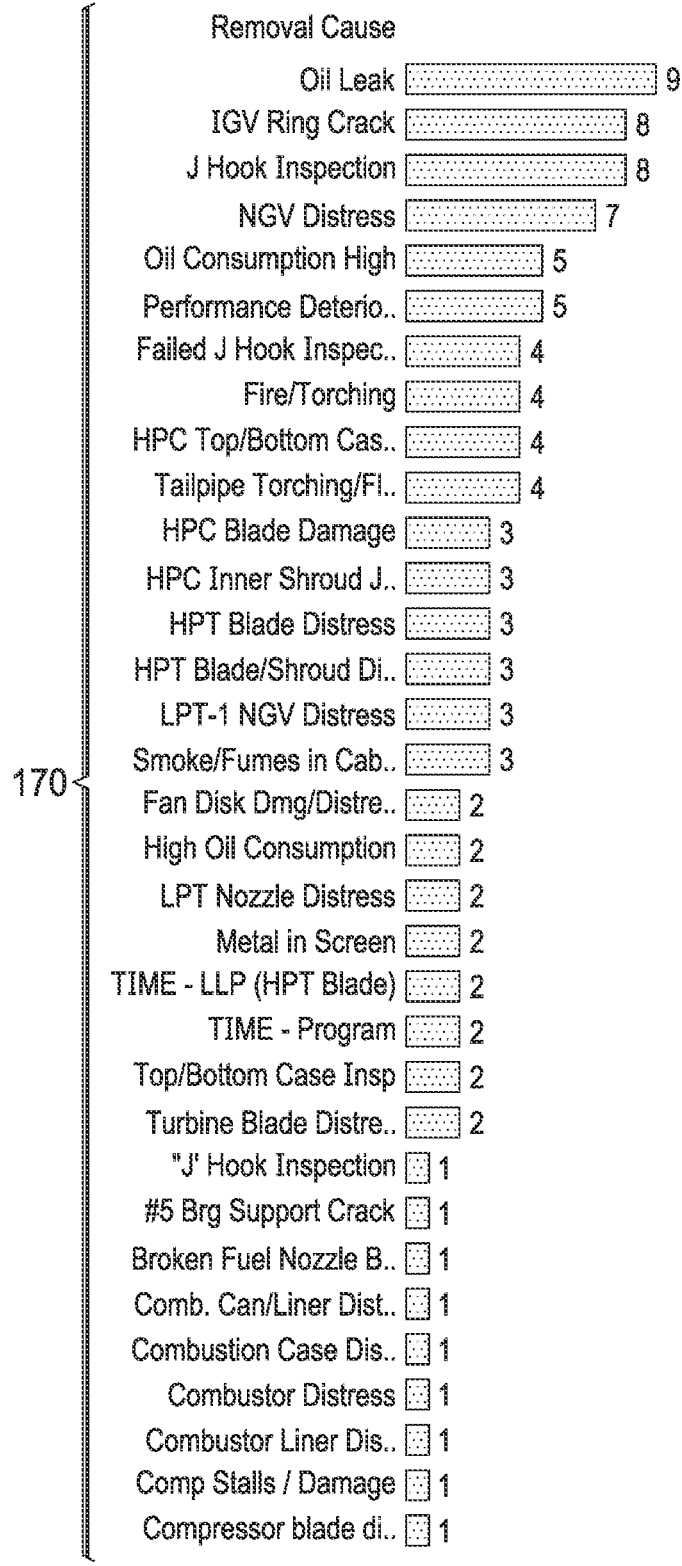
FIG. 4 is a listing of removal causes, according to an example embodiment.

FIG. 3 illustrates the plurality of data sources 50, which provide ambient temperature data 150; manufacturer alert thresholds 155; aircraft specific data 160 such as historical maintenance data 160a, maintenance plan schedule 160b, and historical unexpected removal data 160c; and other data 165. In an example embodiment, the ambient temperature data 150 includes data regarding the ambient temperature in which the engine operated. For example, the ambient temperature data 150 includes data relating to the temperature in a city, state, or general zone. In an example embodiment, the manufacturer alert threshold 155 includes thresholds set by the manufacturer, such as the engine manufacturer, regarding maximum and/or minimum operating parameter thresholds. In an example embodiment, the engine specific data 160 includes data specific to each engine in the fleet 15. For example, the engine specific data 160 includes the historical maintenance data associated with the engine, such as for example when the most recent heavy maintenance check was performed, historical logbook entries, special item cards, component changes, etc. In an example embodiment, the maintenance plan schedule data 160b includes data relating to upcoming planned maintenance or recommended maintenance schedules. In an example embodiment, the historical unexpected removal data 160c includes any past occurrences that resulted in the specific engine being unexpectedly removed from service. A listing 170 of causes for unexpected removal is illustrated in FIG. 4. The most common causes for unexpected removal of an engine include an oil leak, inlet guide vane ring crack, J hook inspection, nozzle guide vane distress, high oil consumption, and performance deterioration.

In some embodiments, the engine sensor module 55 identifies a specific at-risk engine that needs preventative action taken to prevent the unexpected removal of the engine from the fleet 15. In some embodiments, the preventative action taken is much less time-consuming and less expensive than the maintenance/action required if the engine were unexpectedly removed from the fleet 15. In some embodiments, the engine sensor module 55 predicts the next unexpected removal date range, which improves planning and scheduling of maintenance resources if preventative action is not taken (to prevent the unexpected removal). That is, the engine sensor module 55 can rearrange the order of engines planned for heavy or light maintenance based on the at-risk engine listing and/or the predicted time range at which the at-risk engine is expected to have a repair issue that warrants an unexpected removal. Moreover, as one engine can have multiple unscheduled or unexpected removals, the engine sensor module 55 identifies necessary maintenance to minimize or eliminate the number of unscheduled or unexpected removals for each engine.

Figure 5:
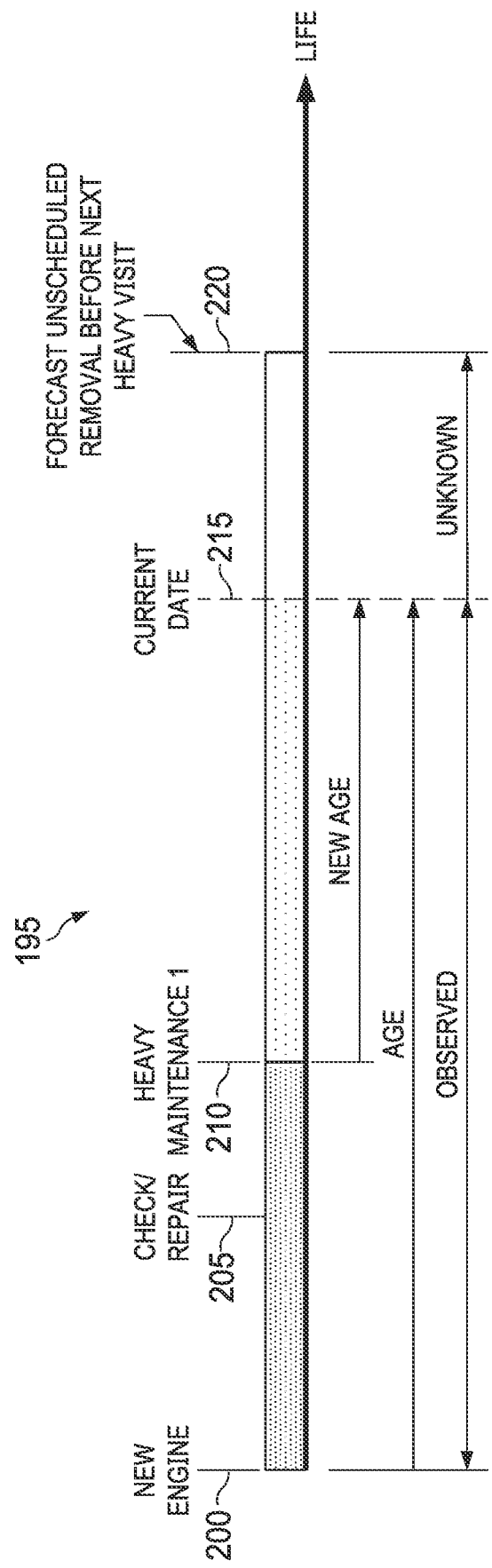
FIG. 5 is a graphical illustration of a timeline for one of the engines of FIG. 2, according to an example embodiment.

Generally, a timeline depicting the life of the engine 35 is depicted in graph 195 of FIG. 5. As illustrated, point 200 is associated with the engine 35 being new, point 205 is associated with a check/repair event, point 210 is associated with a heavy maintenance 1 event, point 215 represents the current date, and point 220 is associated with an unscheduled removal before the next heavy visit. Performance data and other data is tracked and observed throughout the life of the engine 35. As illustrated, after a period of time, the new engine 35 undergoes heavy maintenance 1 depicted by point 210. Multiple checks and repairs can occur prior to this heavy maintenance 1, such as the check/repair event illustrated by point 205. After the heavy maintenance 1 and as the age of the engine 35 increases, the module 55 predicts or forecasts an unscheduled removal or grounding before the next heavy maintenance visit. That is, the module 55 identifies engines that have sensor data profiles that indicate a removal is expected within 15 days, within 30 days, within 60 days, etc. Moreover, the module 55 predicts the remaining life of an engine 35 based on: the trend of the sensor data associated with that engine relative to sensor data associated with all sensors in the fleet 15, the trend of the sensor data associated with that engine relative to predetermined thresholds; the trend of the sensor data associated with that engine relative to historical data relating to that engine, etc. In some embodiments, a trend that indicates that an engine is expected to be removed is based on a number of times sensor data exceeds a threshold (e.g., manufacturer threshold, temperature threshold). In some embodiments, the threshold must be exceeded a number of times within a predetermined period. In other embodiments, the module 55 predicts the remaining life of an engine based on a minimum, maximum, mean, variance, and/or a trend of daily average of past performance. In some embodiments, the module 5 predicts the remaining lie of an engine based on a performance difference of a paired engine. In some embodiments, the module 55 generates alerts close to the predicted unexpected removal date. Thus, the processor 70 is an element adapted to receive signals from the plurality of sensors associated with the fleet 15 and configured to determine a physical status of the engines within the fleet 15, with the physical status relative to other engines within the fleet 15.

Figure 6:
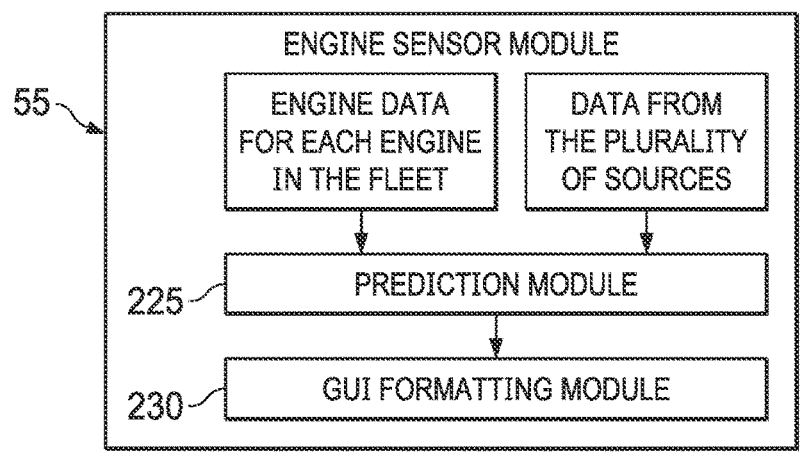
FIG. 6 is a graphical illustration of a data flow within a portion of the system of FIG. 1, according to an example embodiment.

In operation and in some embodiments, and as illustrated in FIG. 6, the engine sensor module 55 uses the data from the plurality of sources 50 and the engine data for each engine in the fleet 15 with a prediction module 225 to identify the at-risk engines. The module 55 also includes a GUI formatting module 230 that formats and presents the data on the GUI 60a in an easily-accessible and interactive manner.

In an example embodiment, as illustrated in FIG. 7 with continuing reference to FIGS. 1-6, a method 250 of operating the system 10 includes: training the module 225 in a first stage using a training data set at step 255, with the step 255 including accessing the training data set at step 260 and using a plurality of machine learning models to generate a plurality of listings of predicted engines using the training data set at step 265; training the module in a second stage using the plurality of listing of predicted engines at step 270, with the step 270 including step 275 of comparing the listing of removed engines with each of the listings of predicted engines to identify false positives and false negatives associated with each of the listings of predicted engines and step 280 of weighing, based on the number of false positives and false negatives within the listing of predicted engines associated with each machine learning model, each machine learning model within a fitness function to minimize a number of false positives and false negatives; accessing engine data for each engine in the fleet 15 at step 285; accessing operational data regarding routine maintenance for each engine in the fleet 15 at step 290; accessing oil consumption data for each engine in the fleet 15 at step 295; creating, using the trained module, the engine data, the operational data, and the oil consumption data, a listing of engines that are predicted to have an unplanned maintenance event within the predetermined period of time at step 300; displaying the listing of engines on the GUI 60a at step 305; providing an alert regarding an engine in the listing of engines at step 310; and routing an aircraft with the engine to a maintenance facility at step 315.

Figure 8:
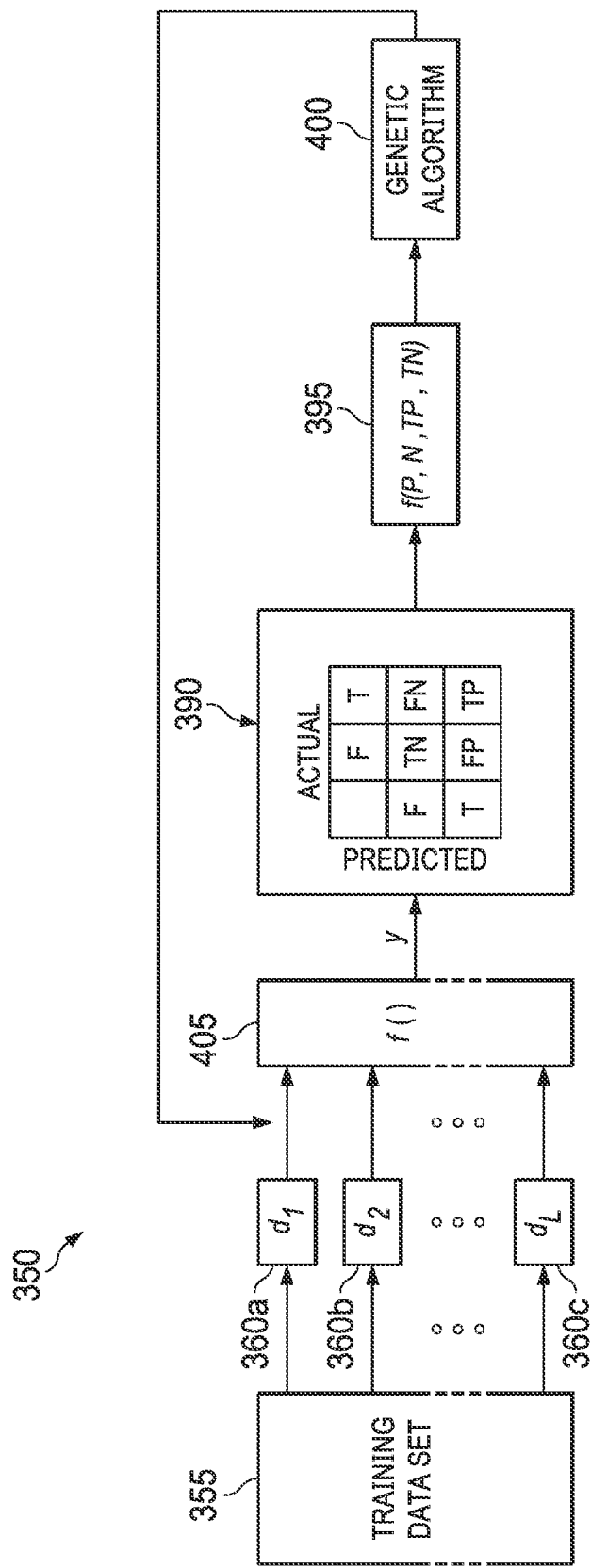
FIG. 8 is a graphical illustration of a data flow within the system of FIG. 1, according to an example embodiment.

In one embodiment and as illustrated by an example data and process flow 350 in FIG. 8, the prediction module 225 is trained in a first stage using a training data set 355 at the step 255. In some embodiments the training data set 355 includes training data for a training grouping of engines that are the same as, or different from, the engines associated with the aircraft fleet 15. In some embodiments, the data set 355 includes engine performance data for each engine in a training grouping of engines; operational data regarding routine maintenance for each engine in the training grouping of engines; oil consumption of each engine in the training grouping of engines; and a listing of removed engines within the training grouping of engines that were removed from service due to an unplanned maintenance event. Generally, the listing of removed engines includes data relating to the removed engines such as timing, cause of removal, etc. In some embodiments, the prediction module 225 separates data by engine.

In some embodiments and at the step 260, the prediction module 225 accesses the training data set 355. In some embodiments, the prediction module 225 accesses the training data set 355 via the plurality of data sources 50. In some embodiments, the training data set 355 is pushed to the prediction module 225, uploaded to the prediction module 225, and/or otherwise accessible to the prediction module 225. In some embodiments, the prediction module 225 queries the plurality of data sources 50 to obtain the training data set.

In some embodiments and at the step 265, the prediction module 225 generates a plurality of listings of predicted engines using the training data set and using a plurality of machine learning models such as 360a, 360b, and 360c illustrated in FIG. 8. In some embodiments, several similar or different "base learners" are combined to generate a final outcome based on different opinions, which adds robustness. This is in part because an ensemble of "weak" leaners can lead to a "stronger" solution. In some embodiments, correlation analysis avoids the inclusion of models that are highly correlated. That is, and in some embodiments, the prediction module 225 leaves models with diversity of opinion in the ensemble or a plurality of machine learning models. The plurality of listings of predicted engines includes listings of engines that are predicted to be unexpectedly removed due to an unplanned maintenance issue. Each machine learning model is associated with at least one listing of predicted engines. Regarding the training set and in some embodiments, the module 225 uses training on data from two classes (e.g., yes or no). In some embodiments, the plurality of machine learning models include a Random Forest ("RF") model; a Naïve Bayes ("NB") model; a Gradient Boosted C Tress model with different learning rate, depth, and iteration scoring ("GBM1"); a Gradient Boosted C Tress model without different learning rate, depth, and iteration scoring ("GBM2"); a Deep Learning model with hyper-parameter searching ("DP1"); a Deep Learning model without hyper-parameter searching ("DP2"); a Logistic Regression model ("GLM"); a Recurrent Neural Network; and a Support Vector Machine model ("SVM"). Moreover, in some embodiments, the module 225 uses training on data from one class (e.g., no) and the plurality of machine learning models includes a Support Vector Data Description model ("SVDD"). In some embodiments, the prediction module 225 uses data from over two hundred variables to predict the remaining life of an engine. Cyclical patterns, seasonality, and other factors are considered when analyzing the data to identify the listing of engines. For example, when a plurality of sensors is used to monitor a common parameter among the engines, the data can be used to identify cyclical patterns. One example of cyclical patterns involves exhaust gas temperature, which increases over time until the engine is washed, which then reduces the exhaust gas temperature. As such, the exhaust gas temperature can be a cyclical pattern based on engine washes. One example of seasonal patterns is oil consumption. Using these adjustments or considerations in data, the prediction module 225 can detect when an engine parameter is outside of an acceptable range or even detect a sensor error. The prediction module 225 also uses the ambient temperature data in determining whether performance of an engine is within acceptable levels. In some embodiments, the prediction module 225 also accounts for the performance of the engines during different phases (e.g., take off and cruise) when evaluating engine performance.

In one embodiment and at step 265, the prediction module 225 is trained in a second stage as described in the steps 270 and 275.

In some embodiments and during the step 270, the listing of removed engines is compared with the listing of predicted engines to identify false position and false negatives associated with each of the listings of predicted engines. In some embodiments, results from the comparison is presented in a training portion 370a of a chart 370 as illustrated in FIG. 9. As illustrated in FIG. 9, each machine learning model in the plurality of machine learning models 375 is associated with a number of engines correctly predicted as not needing to be removed, which is listed in the row 380a, which is associated with a "FALSE" in the "actual" column and a "FALSE" 380b in the "predict" column 380c. Each machine learning model is associated with a number of engines that were incorrectly predicted as needing to be removed, which is listed in the row 380d, which is associated with a "FALSE" in the "actual" column 380b and a "TRUE" in the "predict" column 380c. Each machine learning model is associated with a number of engines that were incorrectly predicted as not needing to be removed, which is listed in the row 380e, which is associated with a "TRUE" in the "actual" column 380b and a "FALSE" in the "predict" column 380c. Finally, each machine learning model is associated with a number of engines that were correctly predicted as needing to be removed, which is listed in the row 380f, which is associated with a "TRUE" in the "actual" column 380b and a "TRUE" in the "predict" column 380c. Referring back to FIG. 8 and in some embodiments, the comparison is used to create a confusion matrix 390.

In some embodiments and during the step 275, the prediction module 225 weighs, based on a number of false positives and a number of false negatives within the listing of predicted engines associated with each machine learning models, each machine learning model within a fitness function to minimize a number of false positives and false negatives. In some embodiments, the module 225 uses stacking (e.g., majority vote, average, log. regression, and weighted average) tuned with genetic algorithms. However, in other embodiments the prediction module 225 weighs based on the correct predictions or a combination of correct predictions and false positives and false negatives. In some embodiments, each machine learning model used is assigned a weight in the weighted average expression:

$$y = \frac{\sum_{m=1}^{L} w_m * d_m}{\sum_{m=1}^{L} w_m} \quad (1)$$

Where:
y: ensemble outcome ~[0,1]
m: model index
L: number of models
d_m: m-th model output ~[0,1]
w_m: m-th model weight ~[0,1]

Referring back to FIG. 8 and in some embodiments, a fitness function 395 and a genetic algorithm ("GA") 400 is used to optimize weights 405 such that the number of True Positives ("TP") and True Negatives ("TN") from the confusion matrix is maximized. In one embodiment, the fitness function is the following equation:

$$\text{fitness}(P,N,\text{TP},\text{TN}) = -\{w_P \cdot (P-\text{TP})^2 + w_N \cdot (N-\text{TN})^2\} \quad (2)$$

Where:
$W_N$ and $W_P$ are weights to modulate importance on maximizing TN/TP; and
N and P are the total number of actual Negative/Positive events, e.g., Engine Non-Removal/Removal In some embodiments, the GA 400 is used to optimize the weights such that the number of False Positives ("FP") and False Negatives ("FN") from the confusion matrix are minimized using a fitness function such as the following equation:

$$\text{fitness}(P,N,\text{FP},\text{FN}) = -\{w_P(P-\text{TP})^2 + w_N(N-\text{TN})^2\} \quad (3)$$

Where:
$W_N$ and $W_P$ are weights to modulate importance on minimizing FP/FN; and
N and P are the total number of actual True/False events, e.g., remove engine/do not remove engine.

In some embodiments, the step 270 also includes a step of accessing a validation data set that includes types of data that is substantially similar to the types of data in the training data set 355. Moreover, the step 270 may also include training the prediction module 225 using the validation data set, the most recent weights, and the plurality of machine learning models to further refine the weights. Results from the comparison associated with the validation data set are illustrated in a validation portion 370b of the chart 370 illustrated in FIG. 9. In some embodiments, the step 270 also includes a step of accessing a testing data set that includes types of data that is substantially similar to the types of data in the training data set 355. Moreover, the step 270 may also include training the prediction module 225 using the testing data set, the most recent weights, and the plurality of machine learning models to further refine the weights. Results from the comparison associated with the testing data set are illustrated in a testing portion 370c of the chart 370 illustrated in FIG. 9. As such, the prediction module 225 uses a training set to generate predictions with probabilities from various algorithms, uses a validation set to select the best ensemble model, and then uses a testing set. Generally, the trained prediction module 225 is when the prediction module 225 identified optimized weights such that a combined number of TPs and TNs from the confusion matrix is maximized and/or a combined number of FPs and FNs from the confusion matrix is minimized.

In some embodiments and at the step 285, the prediction module 225 accesses the engine data for each engine in the fleet 15. Generally, the step 285 is substantially similar to the step 260 except the data accessed is data for the engines in the fleet 15.

In some embodiments and at the step 290, the prediction module 225 accesses operational data regarding routine maintenance for each engine in the fleet 15. Generally, the step 290 is substantially similar to the step 260 except the data accessed is data relating to routine maintenance of each engine in the fleet 15.

In some embodiments and at the step 295, the prediction module 225 accesses oil consumption data for each engine in the fleet 15. Generally, the step 290 is substantially similar to the step 260 except the data accessed is data relating to oil consumption of each engine in the fleet 15.

In some embodiments and at the step 300, the prediction module 225 creates, using the trained module, the engine data, the operational data, and the oil consumption data, a listing of engines that are predicted to have an unplanned maintenance event within the predetermined period of time. After the prediction module 225 is trained and the weights are refined using the genetic algorithm, a listing of engines 410 (shown in FIG. 10) is generated. In some embodiments, the performance metrics for the module 225 indicate that the ensemble provides a true positive rate ("TPR") and a true negative rate ("TNR") above 70%. In some embodiments, there is an alternative accuracy measure to daily-basis forecast, which is based on monthly and biweekly average of the daily removal probability. In this approach, after each period of time (e.g., month or bi-week), the engines in the fleet 15 are ranked based on the average removal probability by the end of the period. A watch list of the top X engines (e.g., X=10, 20, etc.) is the ranking, and these are assumed to be forecast as to be removed within the next 30 days or a prediction window. Finally, the following ratios are calculated and defined as accuracy measures: TP to actual removals ("AR") within the prediction window or TP/AR; and TP to the top X engines or TP/X.

Figure 10:
FIG. 10 is a first screen displayed on the graphical user interface of FIG. 1, according to an example embodiment.

In some embodiments and as illustrated in FIG. 10, the GUI formatting module 230 displays the listing of engines on the GUI 60a at the step 305. In some embodiments, the GUI formatting module 230 formats and displays sensor data associated with the most at-risk engines within the fleet 15. That is, instead of presenting a number of unidentifiable engines that are expected to be removed within a predetermined period of time, the module 230 displays a ranking or list of the most at-risk, identifiable engines for an unexpected removal. FIG. 10 is one embodiment of a screen 415 displayed on the GUI 60a. The screen 415 displays Biweekly Watch List selectable link(s) 420, Monthly Watch List selectable link(s) 425, and Sensor Data selectable link(s) 430. In some embodiments, the selectable link(s) are miniaturized views of the screens associated with the biweekly watch list, the monthly watch list, and the sensor data. As such, the screen 415 illustrates a preview of the screens associated with the links 420, 425, and 430.

Figure 11A:
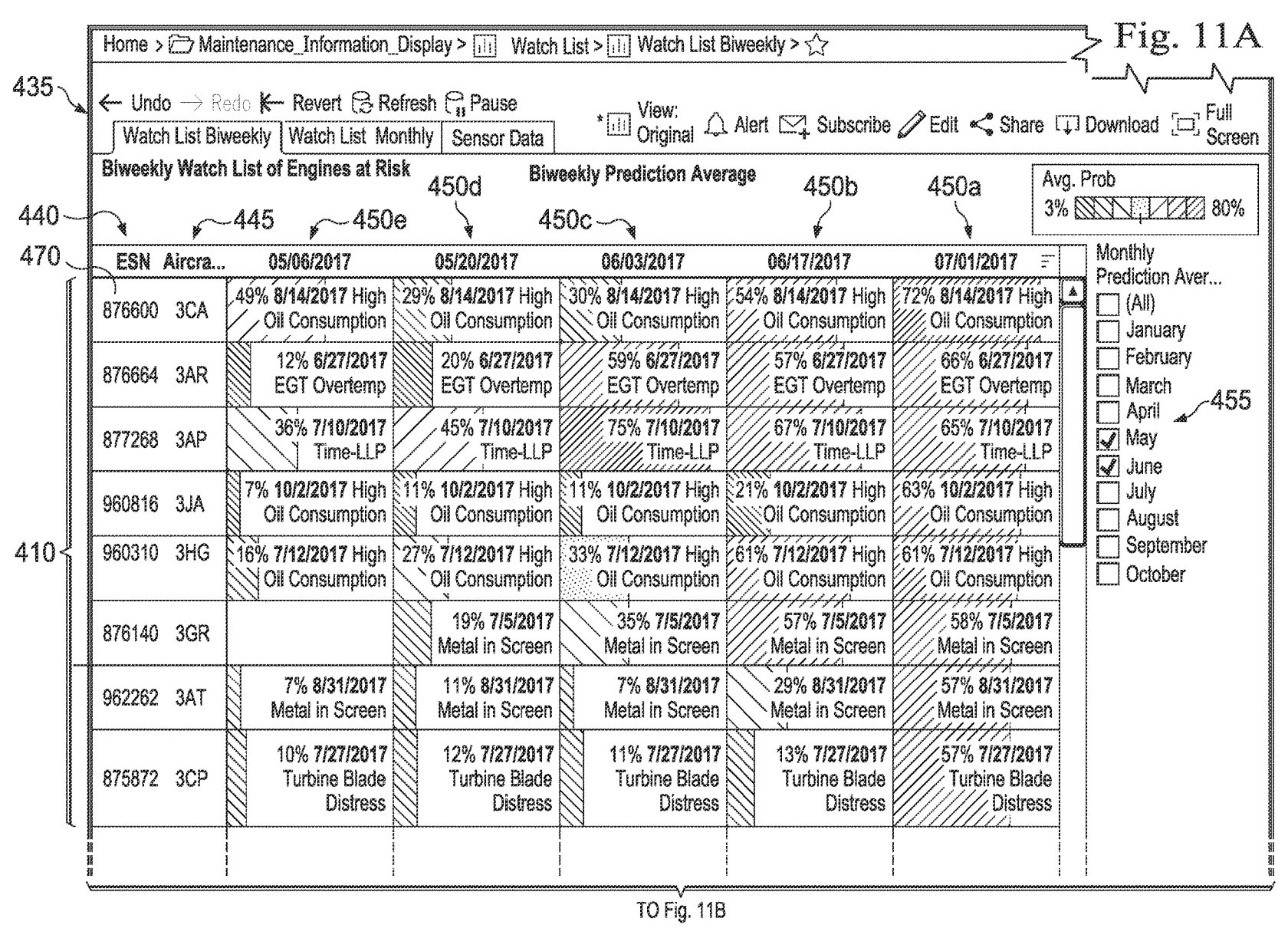

When the system 10 receives a selection command associated with the link 420, via either voice, touch, eye tracking, etc., from a user of the system 10, the GUI formatting module 230 formats and displays a biweekly watch list screen 435 on the GUI 60a, as illustrated in FIGS. 11A and 11B. The screen 435 displays the listing of engines 410 when the predetermined period of time is fourteen days. The screen 435 also includes a chart having an ESN column 440, an aircraft column 445, and periods of time 450a, 450b, 450c, 450d, and 450e. As illustrated, the periods of time 450a-e are two-week increments. In one embodiment, the period of time 450a is the biweekly period associated with the list of engines most at risk for the selected period of time and the periods of time 450b-d illustrate historical data for each of the engines that are ranked in the period of time 450a. Thus, the progression or history of each ranked engine can be easily viewed. The ability to view the progression or history of each ranked engine allows for a user to quickly and accurately identify the most at-risk engine from the listing of engines 410 within the aircraft fleet 15. A row is associated for each engine in the listing of engines 410, with each engine being one of the highest ranked "at-risk" engines. In each row, the following information is provided for an individual engine: ESN, aircraft associated with the engine, and prediction data associated with each period of time 450a-e. Moreover, the screen 435 provides selections for the time periods to be displayed via selectors 455, and selections for the engines (by ESN) to be displayed via selectors 460. For example, an engine 470 of the listing of engines 410 having the ESN 876600 has the highest likelihood of requiring an unexpected removal or grounding. As can be seen in column 450a in the row associated with engine 470 (ESN 876600), the engine has a 72% likelihood that the associated engine will be removed from service due to an unplanned maintenance event within the period of time (i.e., Jul. 1, 2017-Jul. 15, 2017). In some embodiments, each engine and each period of time is associated with a bar chart that represents the percent likelihood that the associated engine will be removed from service due to an unplanned maintenance event within the period of time. This 72% is partly based on sensor data that noted high oil consumption. As can be seen in the associated columns 450b-e, the engine 470 had high oil consumption, or at least was classified as having high oil consumption, for each time period 450b-e. In some embodiments, a date is also listed in the prediction data, and the date is associated with the next scheduled maintenance visit for the engine 470. In some embodiments and as illustrated, the listing of engines 410 are ranked by the percent likelihood or average removal probability by the end of the period of time. In some embodiments, the listing of engines 410 is a watch list and these are forecast to be removed within the next predetermined period of time, such as for example the next 14 days or other preselected period of time. In some embodiments, the system 10 also identifies engines that are not likely to be removed within the predetermined period of time.

When the link 425 (shown in FIG. 10) is selected, a monthly watch list screen 475, as illustrated in FIGS. 12A and 12B, is displayed on the GUI 60a. The screen 475 is similar to the screen 435, and numerals representing similar or identical elements to the elements on screen 435 are repeated here. As illustrated, the screen 475 displays periods of time 450a-c, with the periods of time 450d and 450e omitted. Moreover, the periods of time 450a-c are monthly increments instead of two-week increments. In some embodiments, the engine 470 is scheduled for preventative maintenance to prevent the engine 470 (ESN 876489 for the selected time period) from needing an unscheduled grounding. In some embodiments, the engines in the listing of engines 410 are scheduled for preventative maintenance to prevent each from having an unscheduled grounding. In some embodiments, the sensor data that resulted in the "at-risk" ranking is reviewed for errors or other anomalies. That is, in some instances the sensor itself could need calibrating, cleaning, or replacement. In some embodiments, the identification of the listing of engines 410 aids in scheduling and staffing maintenance centers, and also aids in purchasing and procuring replacement parts for the engines. In some embodiments, the module 55 not only identifies the listing of engines 410, but also identifies the approximate remaining time until the unscheduled grounding occurs for each engine in the listing of engines 410.

Figure 13A:
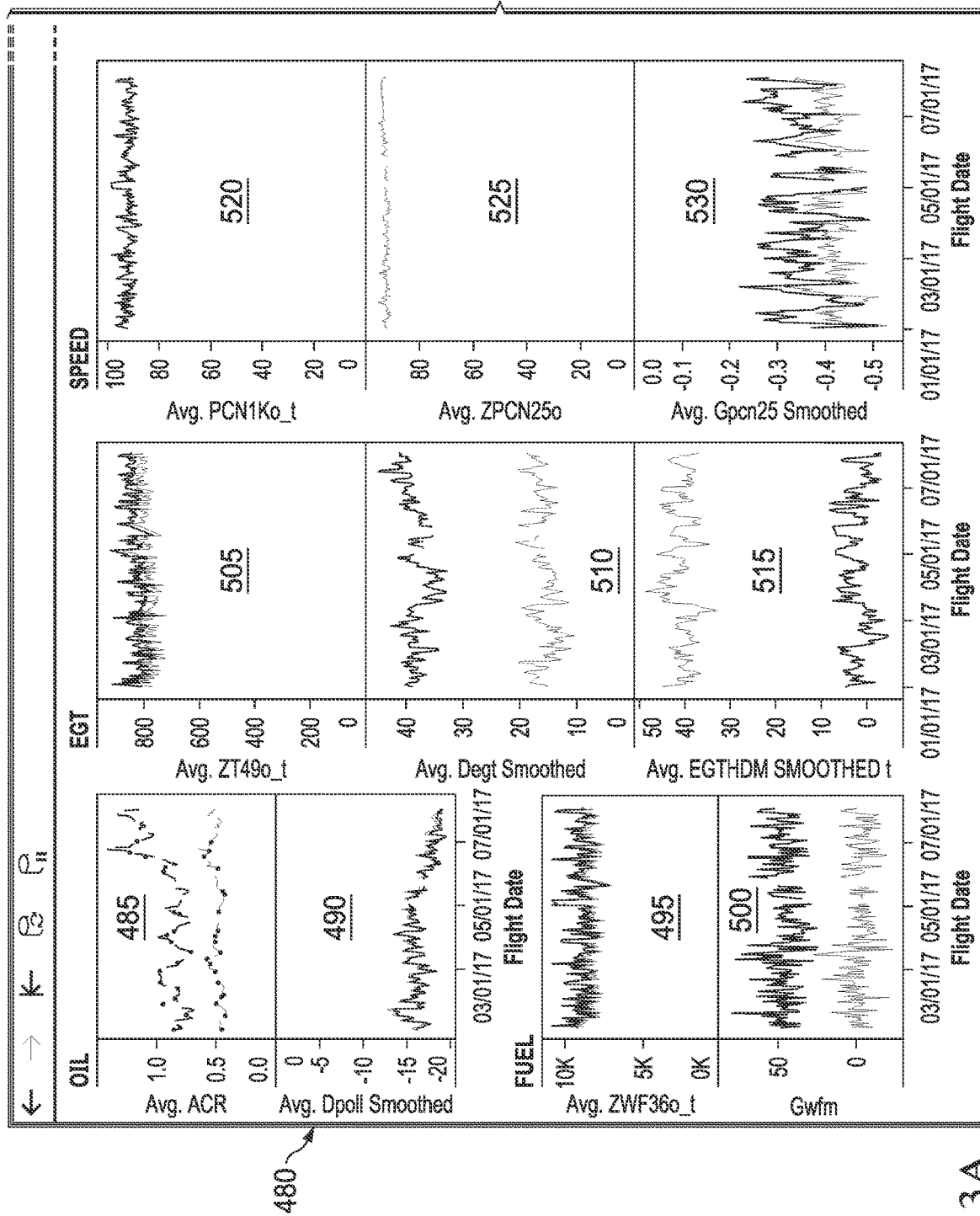
FIGS. 13A and 13B together are a fourth screen displayed on the graphical user interface of FIG. 1, according to an example embodiment.
Figure 13B:
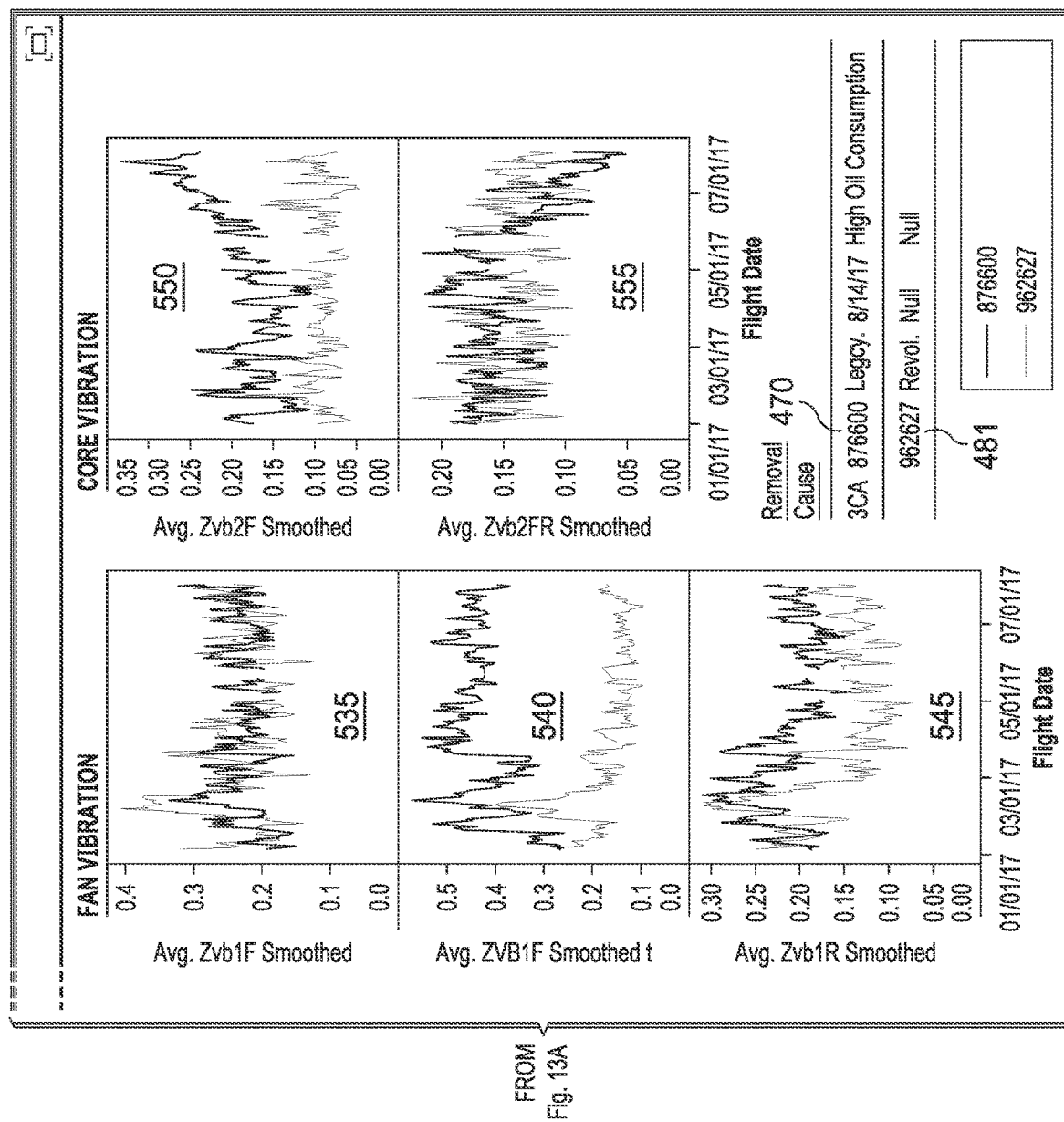
Figure 14:
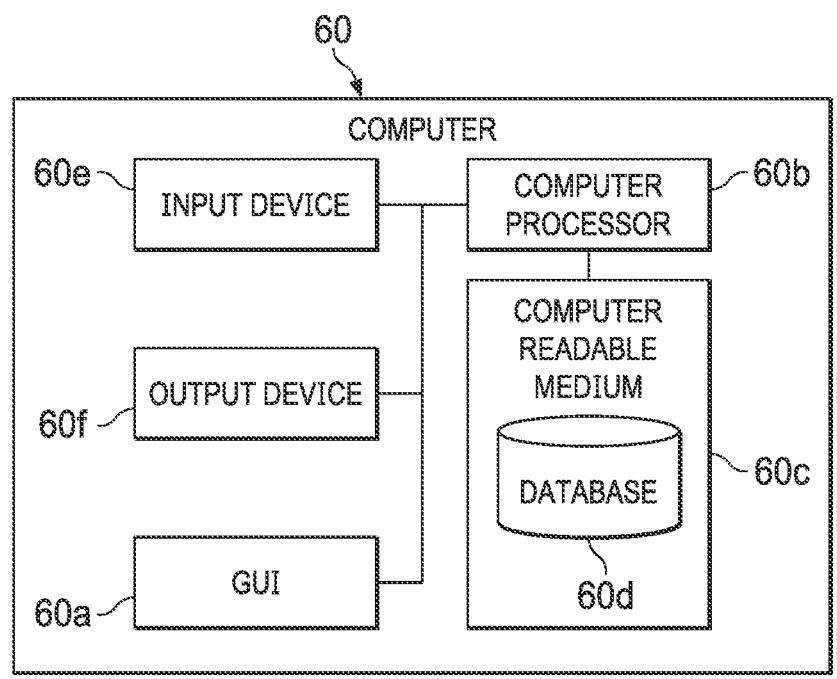
FIG. 14 is an illustration of the computer of FIG. 1, according to an example embodiment.

When the link 430 (shown in FIG. 10) is selected, a sensor data screen 480, as illustrated in FIGS. 13A and 13B, is displayed on the GUI 60a. In some embodiments, the sensor data is associated with the most highly ranked engine for the time period 450a (i.e., engine 470) and an engine(s) 481 that is paired with the engine 470 due to both being coupled to the same aircraft. The sensor data screen 480 displays the sensor data for the engine 470 and the paired engine 481 via an average oil consumption rate ("ACR") graph 485, an average Dpoil smoothed graph 490, an average ZWF360_t graph 495, a Gwfm graph 500, an average ZT49o_t graph 505, an average Degt. smoothed graph 510, an average EGTHDM smoothed t graph 515, an average PCN1Ko-t graph 520, an average ZPCN250 graph 525, an average GPcn25 smoothed graph 530, an average ZVB1F smoothed (Fan Pickup) graph 535, an average ZVB1F smoothed t (Pan Pickup) graph 540, an average ZVB1R smoothed (Rear pickup) graph 545, an average ZVB2F smoothed (Rear Pickup) graph 550, and an average ZVB2R smoothed graph 555. In some embodiments, the graphs 485 and 490 are oil related graphs, the graphs 495 and 500 are fuel related graphs, the graphs 505, 510, and 515 are exhaust gas temperature graphs, the graphs 520, 525, and 530 are speed-related graphs, the graphs 535, 540, and 545 are fan vibration graphs, and the graphs 550 and 555 are core vibration related graphs. In some embodiments, a portion of the graphs, such as the graphs 485, 490, 495, 500, 505, 510, 515, 520, 525, 530, 535, 540, 545, 550, and 555 compare data received by the sensors associated with the engine 470 and its paired engine 481. As such, the deterioration of performance of the engine 470 is comparable (visually) with an engine that is performing within normal ranges (e.g., the paired engine 481).

Returning back to FIG. 7 and at the step 310, the system 10 provides an alert regarding an engine in the listing of engines 410. For example, the alert may include a notice to change the timing of the upcoming planned maintenance such that the planned maintenance is rescheduled for a date that is prior to the date that the engine is expected to have the unplanned maintenance issue, scheduling a new maintenance event prior to the date that the engine is expected to have the unplanned maintenance event, etc. For example and returning back to FIG. 10, an alert 560 is displayed on the screen 415 regarding an engine within the listing of engines 410, such as the engine with ESN 876489. In other embodiments, the alert is a push notification sent to a remote user device associated with a mechanic or other person associated with the maintenance of the engine with ESN 876489. The push notification can include details regarding an upcoming maintenance event for the engine and/or a change to a maintenance event for the engine. In some embodiments, the push notification provides a link or is otherwise selectable to open a screen that includes additional information regarding a maintenance event for the engine with ESN 876489 and/or includes additional information regarding the engine with ESN 876489. In other embodiments, the alert is displayed in an application that is different from the engine sensor module 25, for example an application that manages the scheduling of maintenance events for the fleet 15.

At the step 315, the system 10 routes an aircraft that is coupled to the engine to a maintenance facility. For example and when the engine having the ESN 876489 is expected to have an unplanned maintenance event within the period of time, the system 10 routes the aircraft to a maintenance facility. In some embodiments, not every airport that the aircraft could be scheduled to visit has a maintenance facility that is equipped to perform the maintenance issue required to prevent the unplanned maintenance event. As such and when the system 10 identifies an engine that is likely to have an unplanned maintenance event, the system 10 can notify an application that assigns aircraft (and their associated engines) to flights and/or assign the aircraft to flights that fly between airports that include a maintenance facility equipped to perform the maintenance issue.

In some embodiments and in order to generate the listing of "at-risk" engines 410, the prediction module 225 uses complex machine learning models—which require a non-conventional computing device that is configured, designed, and sized specifically to run—to identify the listing of engines 410.

Figure 15:
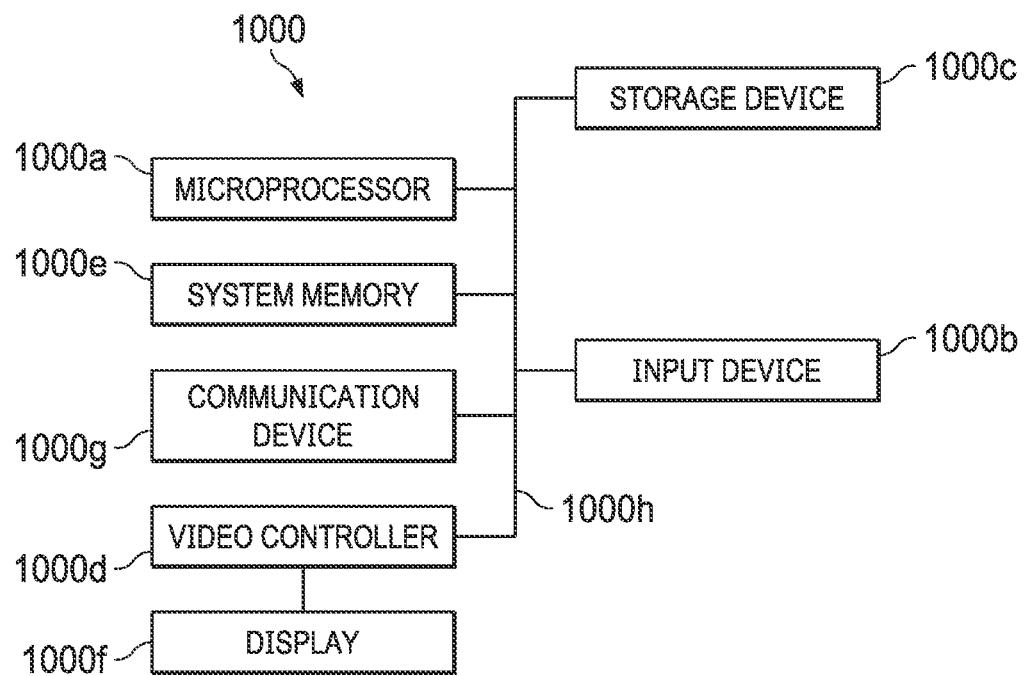
FIG. 15 is a diagrammatic illustration of a node for implementing one or more example embodiments of the present disclosure, according to an example embodiment.

In an example embodiment, as illustrated in FIG. 15 with continuing reference to FIG. 1, the computer 60 includes the GUI 60a, computer processor 60b and a computer readable medium 60c operably coupled thereto. Instructions accessible to, and executable by, the computer processor 60b are stored on the computer readable medium 60c. A database 60d is also stored in the computer readable medium 60c. Generally, the GUI 60a can display a plurality of windows or screens to the user. The computer 60 also includes an input device 60e and an output device 60f. In some embodiments, the input device 60e and the output device 60f are the GUI 60a. In some embodiments, the user provides inputs to the system 10 via a window that is displayed on the GUI 60a. However, the input device 60e can also be a microphone in some embodiments and the output device 60f is a speaker. In several example embodiments, the computer 60 is, or includes, a telephone, a personal computer, a personal digital assistant, a cellular telephone or mobile phone, other types of telecommunications devices, other types of computing devices, and/or any combination thereof. In several example embodiments, the computer 60 includes a plurality of remote user devices.

In several example embodiments, a plurality of instructions stored on the computer readable medium 75 is executed by the processor 70 to cause the processor 70 to carry out or implement in whole or in part the above-described operation of each of the above-described example embodiments of the system, the method, and/or any combination thereof.

In some embodiments, the module 55 includes the processor 70, the computer readable medium 75, and the database 80. The prediction module 225 is stored in, or otherwise associated with, the computer readable medium 75, and the processor 70 executes the training of the module 225 and/or the identifying of the listing of engines 410. In some embodiments, the computer 60 on which the screens 415, 435, and 475 are displayed is remote from the processor 70 and the processor 60b does not train the module 225 and/or identify the listing of engines 410. As such, the display of the screens 415, 435, and 475 on the GUI 60a without the processor 60b identifying the listing of engines 410 improves the functioning of the computer 60. That is, the requirement for the processor 60b to review the data from the plurality of sensors and identify the listing of engines 410 is eliminated, which reduces the processing load compared to the computer 60 needing to review the data from the plurality of sensors and identify the listing of engines 410. Reducing the processing load of the computer 60 generally improves the performance of the computer 60 such that the available memory of the computer 60 is increased and the processing capacity of the computer 60 is increased, therefore making the computer 60 operate more efficiently (e.g., the processing speed of the computer 60 is increased). Thus, the Engine Sensor Module 55 improves the functioning of the computer 60 itself. That is, the system 10 results in specific improvements in computer capabilities (i.e., reduction of required memory and reduction of processing load).

In several example embodiments, execution of one or more steps of the method 250 results in the rescheduling of maintenance events and/or the assignment of specific flights to engines that are in the listing of engines 410 so that the engine is scheduled to visit airports that include maintenance facilities, equipment, or parts that are needed to repair the engine or otherwise restore the engine performance to an acceptable level.

In an example embodiment, the network 65 includes the Internet, one or more local area networks, one or more wide area networks, one or more cellular networks, one or more wireless networks, one or more voice networks, one or more data networks, one or more communication systems, and/or any combination thereof.

In some embodiments, the system 10 is not limited to tracking the performance of aircraft engines. Instead, the system 10 may be used to track the performance of any type of equipment.

In some embodiments, the engine sensor module 55 is, includes, or is part of a neural network. In some embodiments, the engine sensor module 55 is, includes, or is part of a program or other application that is configured for deep learning. In some embodiments, the engine sensor module 55 is, includes, is part of, or interacts with artificial intelligence. In some embodiments, the engine sensor module 55 is, includes, or is part of a software routine, component, program, object, or sequence of instructions, such as an executable script. Furthermore, in some embodiments, the engine sensor module 55 may use a combination of discrete modules or components interacting with one another. In some embodiments, the prediction module 225 is, includes, or is part of a neural network. In some embodiments, the prediction module 225 is, includes, or is part of a program or other application that is configured for deep learning. In some embodiments, the prediction module 225 is, includes, is part of, or interacts with artificial intelligence. In some embodiments, the prediction module 225 is, includes, or is part of a software routine, component, program, object, or sequence of instructions, such as an executable script. Furthermore, in some embodiments, the prediction module 225 may use a combination of discrete modules or components interacting with one another. In some embodiments, the engine sensor module 55 and the prediction module 225 are, include, or are part of a neural network. In some embodiments, the engine sensor module 55 and the prediction module 225 are, include, or are part of a program or other application that is configured for deep learning. In some embodiments, the engine sensor module 55 and the prediction module 225 are, include, are part of, or interact with artificial intelligence. In some embodiments, the engine sensor module 55 and the prediction module 225 are, include, or are part of a software routine, component, program, object, or sequence of instructions, such as an executable script. Furthermore, in some embodiments, the engine sensor module 55 and the prediction module 225 may use a combination of discrete modules or components interacting with one another.

In an example embodiment, as illustrated in FIG. 16 with continuing reference to FIGS. 1-15, an illustrative node 1000 for implementing one or more of the example embodiments described above and/or illustrated in FIGS. 1-15 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones. In several example embodiments, one or more of the components of the systems described above and/or illustrated in FIGS. 1-15 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-15 include respective pluralities of same components.

In several example embodiments, one or more of the applications, systems, and application programs described above and/or illustrated in FIGS. 1-15 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In one embodiment, the disclosure describes a system adapted to identify a listing of engines that are predicted to be removed from service due to an unplanned maintenance event within a predetermined period of time, the system comprising: an aircraft comprising a first wing and a second wing; a first engine coupled to the first wing of the aircraft; a second engine coupled to the second wing of the aircraft; a first plurality of sensors associated with the first engine and adapted to collect first engine performance data; a second plurality of sensors associated with the second engine and adapted to collect second engine performance data; wherein the listing of engines comprises engines within a first plurality of engines that are predicted to be removed from service due to an unplanned maintenance event within the predetermined period of time; and wherein the first plurality of engines comprises the first engine and the second engine; a graphical user interface ("GUI") in communication with at least one processor; and a non-transitory computer readable medium having stored thereon a plurality of instructions, wherein the instructions are executed with at the least one processor so that the following steps are executed: training a module in a first stage using a training data set, wherein the training data set comprises: engine performance data for each engine in a second plurality of engines; operational data regarding routine maintenance for each engine in the second plurality of engines; oil consumption of each engine in the second plurality of engines; and a listing of removed engines that were removed from service due to an unplanned maintenance event, wherein each engine in the listing of removed engines is within the second plurality of engines; and wherein training the module in the first stage comprises using a plurality of machine learning models to generate a plurality of listings of predicted engines based on: the engine performance data for each engine in the second plurality of engines; the operational data regarding routine maintenance for each engine in the second plurality of engines; and the oil consumption of each engine in the second plurality of engines; wherein each machine learning model generates a listing of predicted engines that are predicted to be removed from service due to an unplanned maintenance event; training the module in a second stage using the plurality of listings of predicted engines generated in the first stage, comprising: comparing the listing of removed engines with each of the listings of predicted engines to identify false positives and false negatives associated with each of the listings of predicted engines; and weighing, based on a number of false positives and false negatives within the listing of predicted engines associated with each machine learning model, each machine learning model within a fitness function to minimize a number of combined false positives and a number of combined false negatives; accessing engine data that comprises: engine performance data for each engine in the first plurality of engines, including the first engine performance data and the second engine performance data; operational data regarding routine maintenance for each engine in the first plurality of engines; and oil consumption of each engine in the first plurality of engines; creating, using the trained module and the engine data, the listing of engines within the first plurality of engines that are predicted to have an unplanned maintenance event within the predetermined period of time; and in response to the listing of engines including the first engine and/or the second engine, providing an alert regarding the first engine and/or the second engine on the GUI; wherein the predetermined period of time is thirty-one days or less.

In one embodiment, the disclosure describes a system adapted to track a first plurality of engines, the system comprising: a plurality of sensors coupled to the first plurality of engines and adapted to collect engine-specific information for each engine in the first plurality of engines; wherein the engine-specific information comprises one or more of: exhaust gas temperature; fuel flow; speed; oil pressure; oil consumption; fan vibration; and core vibration; a non-transitory computer readable medium having stored thereon a plurality of instructions, wherein the instructions are executed with at least one processor so that the following steps are executed: accessing the engine-specific information; and identifying, based on the engine-specific information, a listing of engines that comprises engines within the first plurality of engines that are predicted to be removed from service due to an unplanned maintenance event within a predetermined period of time; and a graphical user interface ("GUI") in communication with the at least one processor; wherein the GUI is configured to display the listing of engines. In one embodiment, the instructions are executed with the at least one processor so that the following steps are also executed: accessing maintenance operation data relating to the first plurality of engines; and accessing data associated with oil consumption of each engine in the first plurality of engines; and wherein identifying the listing of engines is also based on the maintenance operation data and the data associated with oil consumption. In one embodiment, the GUI is further configured to display a graphical representation of at least a portion of the engine-specific information. In one embodiment, the GUI is further configured to display a bar chart associated with each engine in the first listing of engines; and each bar chart depicts a likelihood that the associated engine will be removed from service due to an unplanned maintenance event within the predetermined period of time. In one embodiment, each bar chart is selectable to display additional detail regarding the engine-specific information associated with the selected bar chart. In one embodiment, each engine is ranked within the listing of engines based on the likelihood. In one embodiment, each engine in the listing of engines has a paired engine associated with an aircraft to which the each engine and the paired engine are coupled; and each engine in the listing of engines that is displayed on the GUI is selectable to display a comparison between performance of the selected engine and performance of the paired engine of the selected engine. In one embodiment, identifying the listing of engines comprises comparing the engine-specific information for each engine to one or more of: a predetermined threshold; historical engine-specific information for the each engine; the engine-specific information for the engines of the first plurality of engines; seasonal trends; and cyclical non-seasonal trends. In one embodiment, identifying the listing of engines comprises: training a module in a first stage using a training data set, wherein the training data set comprises: engine-specific information for each engine in a second plurality of engines; operational data regarding routine maintenance for each engine in the second plurality of engines; oil consumption of each engine in the second plurality of engines; and a listing of removed engines that were removed from service due to an unplanned maintenance event, wherein each engine in the listing of removed engines is within the second plurality of engines; and wherein training the module in the first stage comprises using a plurality of machine learning models to generate a plurality of listings of predicted engines based on: the engine performance data for each engine in the second plurality of engines; the operational data regarding routine maintenance for each engine in the second plurality of engines; and the oil consumption of each engine in the second plurality of engines; wherein each machine learning model generates a listing of predicted engines that are predicted to be removed from service due to an unplanned maintenance event; training the module in a second stage using the plurality of listings of predicted engines generated in the first stage, comprising: comparing the listing of removed engines with each of the listings of predicted engines to identify false positives and false negatives associated with each of the listings of predicted engines; and weighing, based on a number of false positives and a number of false negatives within the listing of predicted engines associated with each machine learning model, each machine learning model within a fitness function to minimize a number of combined false positives and a number of combined false negatives; accessing operational data regarding routine maintenance for each engine in the first plurality of engines; accessing oil consumption of each engine in the first plurality of engines; and creating the listing of engines using the trained module, the operational data regarding routine maintenance for each engine in the first plurality of engines, the oil consumption of each engine in the first plurality of engines, and the engine-specific information. In one embodiment, the plurality of machine learning models comprises one or more of: a random forest machine learning model; a deep learning machine learning model; a gradient boosted C trees machine learning model; a logistic regression machine learning model; a Naive Bayes machine learning model; and a support-vector-machine machine learning model. In one embodiment, the predetermined period of time is 14 days or less.

In one embodiment, the disclosure describes a method of creating a listing of engines, wherein the listing of engines comprises engines within a first plurality of engines that are predicted to be removed from service due to an unplanned maintenance event within a predetermined period of time, the method comprising: training a module in a first stage using a training data set, wherein the training data set comprises: engine performance data for each engine in a second plurality of engines; operational data regarding routine maintenance for each engine in the second plurality of engines; oil consumption of each engine in the second plurality of engines; and a listing of removed engines that were removed from service due to an unplanned maintenance event, wherein each engine in the listing of removed engines is within the second plurality of engines; and wherein training the module in the first stage comprises using a plurality of machine learning models to generate a plurality of listings of predicted engines based on: the engine performance data for each engine in the second plurality of engines; the operational data regarding routine maintenance for each engine in the second plurality of engines; and the oil consumption of each engine in the second plurality of engines; wherein each machine learning model generates a listing of predicted engines that are predicted to be removed from service due to an unplanned maintenance event; training the module in a second stage using the plurality of listings of predicted engines generated in the first stage, comprising: comparing the listing of removed engines with each of the listings of predicted engines to identify false positives and false negatives associated with each of the listings of predicted engines; and weighing, based on a number of false positives and a number of false negatives within the listing of predicted engines associated with each machine learning model, each machine learning model within a fitness function to minimize a number of combined false positives and a number of combined false negatives; accessing engine data that comprises: engine performance data for each engine in the first plurality of engines; operational data regarding routine maintenance for each engine in the first plurality of engines; and oil consumption of each engine in the first plurality of engines; and creating, using the trained module and the engine data, the listing of engines within the first plurality of engines that are predicted to have an unplanned maintenance event within the predetermined period of time; wherein the predetermined period of time is thirty-one days or less. In one embodiment, the engine performance data for each engine in the first plurality of engines and the engine performance data for each engine in the second plurality of engines comprise one or more of: historical exhaust gas temperature; historical fuel flow; historical speed; historical oil pressure; historical oil consumption; historical fan vibration; and historical core vibration. In one embodiment, the listing of engines comprises engines that have exceeded a predetermined threshold a predetermined number of times. In one embodiment, the predetermined threshold varies based on seasonality and ambient operating temperature of each engine in the first plurality of engines. In one embodiment, the predetermined threshold varies based on a predetermined cyclical pattern. In one embodiment, the method also includes moving, within the predetermined period of time, an aircraft that includes an engine within the listing of engines to a location that includes a maintenance facility. In one embodiment, the method also includes identifying, using the module, a maintenance action needed to prevent the unplanned maintenance event for one of the engines in the listing of engines; identifying, using the module, replacement part(s) associated with the maintenance action; and sending, using the module, a control signal that causes the replacement part(s) to be prepared for the maintenance action. In one embodiment, the method also includes displaying, on a graphical user interface, the listing of engines and an approximate remaining time until the unplanned maintenance event occurs for each engine in the listing of engines.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of creating a listing of components using sensors, wherein each component in the listing of components is within a first plurality of components and is predicted to be removed from service due to an unplanned maintenance event, the method comprising:
   collecting component performance data, for each component in the first plurality of components, from one or more sensors associated with the first plurality of components;
   collecting component performance data, for each component in a second plurality of components, from one or more sensors associated with the second plurality of components;
   training a module in a first stage using a training data set, wherein the training data set comprises:
      the component performance data for each component in the second plurality of components collected from the one or more sensors associated with the second plurality of components;
      operational data regarding maintenance for each component in the second plurality of components; and
      a listing of removed components each of which was removed from service due to an unplanned maintenance event, wherein each component in the listing of removed components is within the second plurality of components;
   wherein training the module in the first stage comprises using one or more machine learning models to generate one or more listings of predicted components based on:
      the component performance data for each component in the second plurality of components collected from the one or more sensors associated with the second plurality of components; and
      the operational data regarding maintenance for each component in the second plurality of components; and
      wherein each of the predicted components is predicted to be removed from service due to an unplanned maintenance event;
   accessing component data,
      wherein the component data comprises:
      the component performance data for each component in the first plurality of components collected from the one or more sensors associated with the first plurality of components; and
      operational data regarding maintenance for each component in the first plurality of components;

and
creating, using the trained module and the accessed component data, the listing of components within the first plurality of components, each component in the listing of components being predicted to have an unplanned maintenance event.

2. The method of claim 1, further comprising:
training the module in a second stage using the one or more listings of predicted components generated in the first stage.

3. The method of claim 2, wherein training the module in the second stage using the one or more listings of predicted components generated in the first stage comprises:
weighing each of the one or more machine learning models within a fitness function.

4. The method of claim 2, wherein training the module in the second stage using the one or more listings of predicted components generated in the first stage comprises:
comparing the listing of removed components with each of the one or more listings of predicted components to identify false positives and false negatives associated with each of the one or more listings of predicted components.

5. The method of claim 4, wherein training the module in the second stage using the one or more listings of predicted components generated in the first stage further comprises:
weighing, based on a number of false positives and a number of false negatives within the listing of predicted components associated with each of the one or more machine learning models, each of the one or more machine learning models within a fitness function to minimize prediction error.

6. The method of claim 5, wherein weighing each of the one or more machine learning models within the fitness function to minimize prediction error comprises:
weighing each of the one or more machine learning models within the fitness function to minimize a number of combined false positives and a number of combined false negatives.

7. The method of claim 1, wherein each component in the listing of components is predicted to have an unplanned maintenance event within a predetermined period of time; and
wherein the method further comprises moving, within the predetermined period of time, each component in the listing of components to a maintenance facility.

8. The method of claim 1, further comprising:
identifying, using the module, a maintenance action needed to prevent the unplanned maintenance event for one of the components in the listing of components;
identifying, using the module, replacement part(s) associated with the maintenance action; and
sending, using the module, a control signal that causes the replacement part(s) to be prepared for the maintenance action.

9. The method of claim 1, further comprising displaying, on a graphical user interface, the listing of components and an approximate remaining time until the unplanned maintenance event occurs for each component in the listing of components.

10. The method of claim 1, wherein each component in the listing of components is a piece of equipment.

11. The method of claim 10, wherein the piece of equipment is an engine.

12. The method of claim 1, wherein the one or more machine learning models comprise one or more of the following: a machine learning classification model; a machine learning regression model; a random forest machine learning model; a deep learning machine learning model; a gradient boosted C trees machine learning model; a logistic regression machine learning model; a Naive Bayes machine learning model; a support-vector-machine machine learning model.

13. The method of claim 1, wherein the operational data regarding maintenance for each component in the second plurality of components comprises operational data regarding routine maintenance for each component in the second plurality of components; and
wherein the operational data regarding maintenance for each component in the first plurality of components comprises operational data regarding routine maintenance for each component in the first plurality of components.

14. A system adapted to create a listing of components using sensors, wherein each component in the listing of components is within a first plurality of components and is predicted to be removed from service due to an unplanned maintenance event, the system comprising:
one or more sensors associated with the first plurality of components;
one or more sensors associated with a second plurality of components; and
a non-transitory computer readable medium having stored thereon a plurality of instructions, wherein the instructions are executed with at least one processor so that the following steps are executed:
collecting component performance data, for each component in the first plurality of components, from the one or more sensors associated with the first plurality of components;
collecting component performance data, for each component in the second plurality of components, from the one or more sensors associated with the second plurality of components;
training a module in a first stage using a training data set, wherein the training data set comprises:
the component performance data for each component in the second plurality of components collected from the one or more sensors associated with the second plurality of components;
operational data regarding maintenance for each component in the second plurality of components; and
a listing of removed components each of which was removed from service due to an unplanned maintenance event, wherein each component in the listing of removed components is within the second plurality of components;
wherein training the module in the first stage comprises using one or more machine learning models to generate one or more listings of predicted components based on:
the component performance data for each component in the second plurality of components collected from the one or more sensors associated with the second plurality of components; and
the operational data regarding maintenance for each component in the second plurality of components; and
wherein each of the predicted components is predicted to be removed from service due to an unplanned maintenance event;

accessing component data,
  wherein the component data comprises:
    the component performance data for each component in the first plurality of components collected from the sensors associated with the first plurality of components; and
    operational data regarding maintenance for each component in the first plurality of components; and
  creating, using the trained module and the accessed component data, the listing of components within the first plurality of components, each component in the listing of components being predicted to have an unplanned maintenance event.

15. The system of claim 14, wherein the instructions are executed with the at least one processor so that the following step is also executed:
  training the module in a second stage using the one or more listings of predicted components generated in the first stage.

16. The system of claim 15, wherein training the module in the second stage using the one or more listings of predicted components generated in the first stage comprises:
  weighing each of the one or more machine learning models within a fitness function.

17. The system of claim 15, wherein training the module in the second stage using the one or more listings of predicted components generated in the first stage comprises:
  comparing the listing of removed components with each of the one or more listings of predicted components to identify false positives and false negatives associated with each of the one or more listings of predicted components.

18. The system of claim 17, wherein training the module in the second stage using the one or more listings of predicted components generated in the first stage further comprises:
  weighing, based on a number of false positives and a number of false negatives within the listing of predicted components associated with each of the one or more machine learning models, each of the one or more machine learning models within a fitness function to minimize prediction error.

19. The system of claim 18, wherein weighing each of the one or more machine learning models within the fitness function to minimize prediction error comprises:
  weighing each of the one or more machine learning models within the fitness function to minimize a number of combined false positives and a number of combined false negatives.

20. The system of claim 14, wherein the instructions are executed with the at least one processor so that the following steps are also executed:
  identifying, using the module, a maintenance action needed to prevent the unplanned maintenance event for one of the components in the listing of components;
  identifying, using the module, replacement part(s) associated with the maintenance action; and
  sending, using the module, a control signal that causes the replacement part(s) to be prepared for the maintenance action.

21. The system of claim 14, wherein the instructions are executed with the at least one processor so that the following step is also executed:
  displaying, on a graphical user interface, the listing of components and an approximate remaining time until the unplanned maintenance event occurs for each component in the listing of components.

22. The system of claim 14, wherein each component in the listing of components is a piece of equipment.

23. The system of claim 22, wherein the piece of equipment is an engine.

24. The system of claim 14, wherein the operational data regarding maintenance for each component in the second plurality of components comprises operational data regarding routine maintenance for each component in the second plurality of components; and
  wherein the operational data regarding maintenance for each component in the first plurality of components comprises operational data regarding routine maintenance for each component in the first plurality of components.

25. A method of creating a listing of components using sensors, wherein each component in the listing of components is within a first plurality of components and is predicted to be removed from service due to an unplanned maintenance event, the method comprising:
  determining a training data set comprising:
    component performance data for each component in a second plurality of components collected from one or more sensors associated with the second plurality of components;
    operational data regarding maintenance for each component in the second plurality of components; and
    a listing of removed components within the second plurality of components that were removed from service due to an unplanned maintenance event;
  training a module in a first stage using one or more machine learning models to generate one or more listings of predicted components that are predicted to be removed from service due to an unplanned maintenance event based on the training data set;
  accessing component data comprising:
    component performance data for each component in the first plurality of components collected from one or more sensors associated with the first plurality of components; and
    operational data regarding maintenance for each component in the first plurality of components; and
  creating, using the trained module and the accessed component data, the listing of components within the first plurality of components predicted to have an unplanned maintenance event.

26. The method of claim 25, further comprising:
  training the module in a second stage using the one or more listings of predicted components generated in the first stage.

27. The method of claim 26, wherein training the module in the second stage using the one or more listings of predicted components generated in the first stage comprises:
  weighing each of the one or more machine learning models within a fitness function.

28. The method of claim 26, wherein training the module in the second stage using the one or more listings of predicted components generated in the first stage comprises:
  comparing the listing of removed components with each of the one or more listings of predicted components to identify false positives and false negatives associated with each of the one or more listings of predicted components.

29. The method of claim 28, wherein training the module in the second stage using the one or more listings of predicted components generated in the first stage further comprises:
- weighing, based on a number of false positives and a number of false negatives within the listing of predicted components associated with each of the one or more machine learning models, each of the one or more machine learning models within a fitness function to minimize prediction error.

30. The method of claim 29, wherein weighing each of the one or more machine learning models within the fitness function to minimize prediction error comprises:
- weighing each of the one or more machine learning models within the fitness function to minimize a number of combined false positives and a number of combined false negatives.

\* \* \* \* \*